United States Patent
Nakarmi et al.

(10) Patent No.: US 12,425,868 B2
(45) Date of Patent: Sep. 23, 2025

(54) TRACKING OF A TARGET IN A WIRELESS COMMUNICATION NETWORK

(71) Applicant: Telefonaktiebolaget LM Ericsson (publ), Stockholm (SE)

(72) Inventors: Prajwol Kumar Nakarmi, Sollentuna (SE); Alessandro Mordacci, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 467 days.

(21) Appl. No.: 17/795,366

(22) PCT Filed: Jan. 30, 2020

(86) PCT No.: PCT/EP2020/052348
§ 371 (c)(1),
(2) Date: Jul. 26, 2022

(87) PCT Pub. No.: WO2021/151497
PCT Pub. Date: Aug. 5, 2021

(65) Prior Publication Data
US 2024/0031816 A1 Jan. 25, 2024

(51) Int. Cl.
*H04W 12/80* (2021.01)
*H04W 12/06* (2021.01)
*H04W 12/122* (2021.01)

(52) U.S. Cl.
CPC ........... *H04W 12/80* (2021.01); *H04W 12/06* (2013.01); *H04W 12/122* (2021.01)

(58) Field of Classification Search
CPC ..... H04W 12/06; H04W 12/04; H04W 4/029; H04W 4/38; H04W 12/069; H04W 12/40;
(Continued)

(56) References Cited

U.S. PATENT DOCUMENTS

| | | | |
|---|---|---|---|
| 2015/0103776 A1* | 4/2015 | Luther | H04W 76/11 370/329 |
| 2020/0068391 A1* | 2/2020 | Liu | H04W 12/06 |

FOREIGN PATENT DOCUMENTS

| | | |
|---|---|---|
| EP | 3573304 A1 | 11/2019 |
| WO | 2019068832 A1 | 4/2019 |

OTHER PUBLICATIONS

3GPP, "3GPP TS 33.127 V16.2.0", 3rd Generation Partnership Project; Technical Specification Group Services and System Aspects; Security; Lawful Interception (LI) architecture and functions (Release 16), Dec. 2019, 1-80.

(Continued)

*Primary Examiner* — Kwasi Karikari
(74) *Attorney, Agent, or Firm* — Murphy, Bilak & Homiller, PLLC

(57) ABSTRACT

Network equipment (10) is configured for use in a wireless communication network (12). The network equipment (10) is configured to receive, over an interface (22) with radio equipment (14), a request (24) for information (26) based on which is determinable an unobfuscated identifier (20) associated with a target (16) being tracked by the radio equipment (14). The unobfuscated identifier (20) may be obfuscated by an obfuscating identifier (18) associated with the target (16). The network equipment (10) is also configured to send, from the network equipment (10) to the radio equipment (14), a response (28) that includes the requested information (26).

20 Claims, 14 Drawing Sheets

(58) Field of Classification Search
CPC ..... H04W 4/025; H04W 4/027; H04W 64/00; H04W 8/16
See application file for complete search history.

(56) References Cited

OTHER PUBLICATIONS

3GPP, "3GPP TS 33.128 V16.1.0", 3rd Generation Partnership Project; Technical Specification Group Services and System Aspects; Security; Protocol and procedures for Lawful Interception (LI); Stage 3 (Release 16), Dec. 2019, 1-67.

Author Unknown, "HackRF One 1MHz to 6GHz Software Defined Radio Platform Development Board H8X9", <https://www.ebay.co.uk/itm/283558223443>, accessed Jan. 2020, 2019, 1-2.

Author Unknown, "Law enforcement and judicial aspects related to 5G", Council of the European Union, EU Counter-Terrorism Coordinator, LIMITE, 8983/19, Brussels, May 6, 2019, 1-10.

Author Unknown, "SigintOS Download", Signal Intelligence Operation System, <https://www.sigintos.com>, accessed Jan. 2020, 2020, 1-2.

Author Unknown, "Software Defined Radio Receiver USB Stick—RTL2832 w/R820T", Wireless, Software Defined Radio, <https://www.adafruit.com/product/1497>, accessed Jan. 2020, 2019, 1-4.

Author Unknown, "srsLTE Your own mobile network", <https://www.srsite.com>, accessed Jan. 2020, Software Radio Systems (SRS), 2020, 1-4.

Jerichow, Anja, et al., "LI solution related to privacy based on UE generated verification hash (VH)", 3GPP Draft, S3-180768A Attachment to Discussion on LI Conformity by Verification Hash -V5, Feb. 19, 2018, 1-8.

Nakarmi, Prajwol Kumar, et al., "3GPP Release 15: an end to the battle against false base stations?", Ericsson BLOG, <https://www.ericsson.com/en/blog/2019/1/3gpp-release15>, Jan. 18, 2019, 1-7.

Nakarmi, Prajwol Kumar, et al., "Fighting IMSI catchers: a look at 5G cellular paging privacy", Ericsson BLOG, <https://www.ericsson.com/en/blog/2019/5/fighting-imsi-catchers-5g-cellular-paging-privacy>, May 2, 2019, 1-11.

Norrman, Karl, et al., "Protecting 5G against IMSI catchers", Ericsson BLOG, <https://www.ericsson.com/en/blog/2017/6/protecting-5g-against-imsi-catchers>, Jun. 29, 2017, 1-8.

\* cited by examiner

TRACKING OF A TARGET IN A WIRELESS COMMUNICATION NETWORK

TECHNICAL FIELD

The present application relates to a wireless communication network, and relates more particularly to tracking of a target in a wireless communication network.

BACKGROUND

A false base station impersonates a genuine base station of a wireless communication network, in order to surreptitiously trick a target wireless device into sharing information with the false base station. The false base station may for example trick the target wireless device into revealing identifying information associated with the wireless device, such as an identifier unique to the wireless device (e.g., an International Mobile Equipment Identifier, IMSE) or an identifier unique to a subscriber using the wireless device (e.g., an International Mobile Subscriber Identity, IMSI). The identifying information can then be used for any number of reasons, such as to physically locate and track the target wireless device over time. Because a false base station can be used to "catch" an IMSI in this way, a false base station is also known as an "IMSI catcher". Other names for a false base station include "Stingray", "rogue base station", and "cell site simulator".

False base stations have traditionally been used for malicious activity, such as unauthorized surveillance, communication sabotage, or unsolicited advertising. Accordingly, as wireless communication networks have evolved from generation to generation, security improvements have aimed to patch vulnerabilities exploited by false base stations. The $5^{th}$ generation (5G) of wireless communication networks in this regard conceals permanent identifiers, and regularly refreshes temporary identifiers, so as to prevent a false base station from tracking a wireless device or its subscriber.

These security improvements, however, jeopardize potentially legitimate uses of false base stations. For example, the security improvements jeopardize the ability of law enforcement agencies to use a false base station to track a suspected criminal or other target for lawful intercept, e.g., even without a warrant. Challenges exist, therefore, in protecting the privacy of subscribers against malicious attacks while also allowing legitimate uses of false base stations such as by law enforcement agencies for lawful intercept.

SUMMARY

An object of one or more embodiments herein is to enable safeguarding of a subscriber of wireless communication service against a malicious attack on his or her privacy while also facilitating lawful intercept by an authorized party.

Some embodiments herein provide obfuscation of an identifier transmitted over-the-air, so as to safeguard wireless subscriber privacy, but also provide an authorized party with network assistance so that the authorized party can determine an unobfuscated identifier associated with a target. Some embodiments may thereby advantageously protect against malicious attack while also facilitating lawful intercept. For example, some embodiments may enable law enforcement agencies to use a false base station or International Mobile Subscriber Identity (IMSI) catcher to track a target in a 5G wireless communication network, while still allowing the network to safely conceal permanent subscriber identifiers.

More particularly, embodiments herein include a method performed by network equipment configured for use in a wireless communication network. The method may comprise receiving, over an interface with radio equipment, a request for information based on which is determinable an unobfuscated identifier associated with a target being tracked by the radio equipment. In some embodiments, the unobfuscated identifier is obfuscated by an obfuscating identifier associated with the target. The method may also comprise sending, from the network equipment to the radio equipment, a response that includes the requested information.

In some embodiments, the request includes obfuscating identifiers that the radio equipment detects as being transmitted over-the-air as the radio equipment tracks the target over time, where each obfuscating identifier obfuscates a respective unobfuscated identifier. In one such embodiment, the method further comprises determining the unobfuscated identifier associated with the target by evaluating the obfuscating identifiers included in the request, where the information included in the response comprises the unobfuscated identifier determined as being associated with the target. In other embodiment, the method further comprises determining unobfuscated identifiers that are respectively obfuscated by the obfuscating identifiers included in the request, where the information included in the response comprises the determined unobfuscated identifiers. In either case, in some embodiment, each obfuscating identifier comprises an encrypted version of the associated unobfuscated identifier. For example, each obfuscating identifier may be a Subscription Concealed Identifier, SUCI. In other embodiments, each obfuscating identifier comprises a temporary identifier whose association with a respective unobfuscated identifier is only temporary. For example, each obfuscating identifier may be either a Serving Temporary Mobile Subscriber Identity, S-TMSI, a Globally Unique Temporary Identifier, GUTI, or a 5G GUTI.

In some embodiments, the request indicates where and when the target has been or will be tracked by the radio equipment. For example, in some embodiments, a timestamp in the request indicates when the target has been or will be tracked by the radio equipment and geographical coordinates in the request indicate where the target has been or will be tracked by the radio equipment or indicate a geographical position of the radio equipment. In some embodiments, the method further comprises requesting obfuscating identifiers from wireless devices where and when the target is being tracked.

In some embodiments, the unobfuscated identifier associated with the target is a Subscription Permanent Identifier, SUPI, or a Permanent Equipment Identifier, PEI.

In some embodiments, the unobfuscated identifier associated with the target is an International Mobile Subscriber Identity, IMSI, or an International Mobile Equipment Identifier, IMEI.

In some embodiments, the network equipment implements at least a Unified Data Management, UDM, function or a Subscription Identifier Deconcealing Function, SIDF.

In some embodiments, the network equipment implements at least a Lawful Intercept Administration Function, ADMF.

In some embodiments, the network equipment implements at least a Mediation Function 2, MF2.

In some embodiments, the method further comprises performing a mutual authentication procedure for the radio equipment to authenticate the network equipment and the network equipment to authenticate the radio equipment, where said receiving is performed after performing the mutual authentication procedure.

In some embodiments, the interface is an interface configured for real time communication.

In some embodiments, the radio equipment is radio equipment of a law enforcement agency.

In some embodiments, the radio equipment is a cell site simulator, a false base station, or an IMSI catcher.

Embodiments herein also include a method performed by radio equipment, e.g., for tracking a target. The method may comprise sending, over an interface to network equipment in a wireless communication network, a request for information based on which is determinable an unobfuscated identifier associated with the target. In some embodiments, the unobfuscated identifier is obfuscated by an obfuscating identifier associated with the target. The method may also comprise receiving, from the network equipment, a response that comprises the requested information.

In some embodiments, the method further comprising detecting obfuscating identifiers transmitted over-the-air as the radio equipment tracks the target over time, wherein each obfuscating identifier obfuscates a respective unobfuscated identifier, and wherein the request includes the obfuscating identifiers detected.

In some embodiments, detecting obfuscating identifiers transmitted over-the-air comprises simulating radio network equipment of the wireless communication network, and requesting and receiving the obfuscating identifiers from respective wireless devices that are attempting to attach to the radio network equipment or perform location updates. In other embodiments, detecting obfuscating identifiers transmitted over-the-air comprises passively monitoring for obfuscating identifiers transmitted in location update messages or paging messages.

In some embodiments, the request indicates where and when the target has been or will be tracked by the radio equipment. For example, in some embodiments, a timestamp in the request indicates when the target has been or will be tracked by the radio equipment and geographical coordinates in the request indicate where the target has been or will be tracked by the radio equipment or indicate a geographical position of the radio equipment.

In some embodiments, the requested information included in the response comprises the unobfuscated identifier associated with the target.

In some embodiments, the requested information included in the response comprises unobfuscated identifiers that are respectively obfuscated by obfuscating identifiers transmitted over-the-air as the radio equipment tracks the target over time. In this case, the method may further comprise determining the unobfuscated identifier associated with the target by evaluating the unobfuscated identifiers included in the response.

In some embodiments, each obfuscating identifier comprises an encrypted version of the associated unobfuscated identifier.

In some embodiments, each obfuscating identifier is a Subscription Concealed Identifier, SUCI.

In some embodiments, each obfuscating identifier comprises a temporary identifier whose association with a respective unobfuscated identifier is only temporary.

In some embodiments, each obfuscating identifier is either a Serving Temporary Mobile Subscriber Identity, S-TMSI, a Globally Unique Temporary Identifier, GUTI, or a 5G GUTI.

In some embodiments, the unobfuscated identifier associated with the target is a Subscription Permanent Identifier, SUPI, or a Permanent Equipment Identifier, PEI.

In some embodiments, the unobfuscated identifier associated with the target is an International Mobile Subscriber Identity, IMSI, or an International Mobile Equipment Identifier, IMEI.

In some embodiments, the network equipment implements at least a Unified Data Management, UDM, function or a Subscription Identifier Deconcealing Function, SIDF.

In some embodiments, the network equipment implements at least a Lawful Intercept Administration Function, ADMF.

In some embodiments, the network equipment implements at least a Mediation Function 2, MF2.

In some embodiments, the method further comprises performing a mutual authentication procedure for the radio equipment to authenticate the network equipment and the network equipment to authenticate the radio equipment. In this case, said sending may be performed after performing the mutual authentication procedure.

In some embodiments, the interface is an interface configured for real time communication.

In some embodiments, the radio equipment is radio equipment of a law enforcement agency.

In some embodiments, the radio equipment is a cell site simulator, a false base station, or an IMSI catcher.

Embodiments herein also include corresponding apparatus, computer programs, and carriers such as non-transitory computer-readable mediums. For example, embodiments herein include radio equipment, e.g., for tracking a target. The radio equipment may be configured (e.g., via radio frequency circuitry and processing circuitry) to send, over an interface to network equipment in a wireless communication network, a request for information based on which is determinable an unobfuscated identifier associated with the target. In some embodiments, the unobfuscated identifier is obfuscated by an obfuscating identifier associated with the target. The radio equipment may also be configured to receive, from the network equipment, a response that comprises the requested information.

Embodiments herein further include network equipment configured for use in a wireless communication network. The network equipment may be configured (e.g., via communication circuitry and processing circuitry) to receive, over an interface with radio equipment, a request for information based on which is determinable an unobfuscated identifier associated with a target being tracked by the radio equipment. In some embodiments, the unobfuscated identifier is obfuscated by an obfuscating identifier associated with the target. The network equipment may also be configured to send, from the network equipment to the radio equipment, a response that includes the requested information.

DETAILED DESCRIPTION

Figure 1:
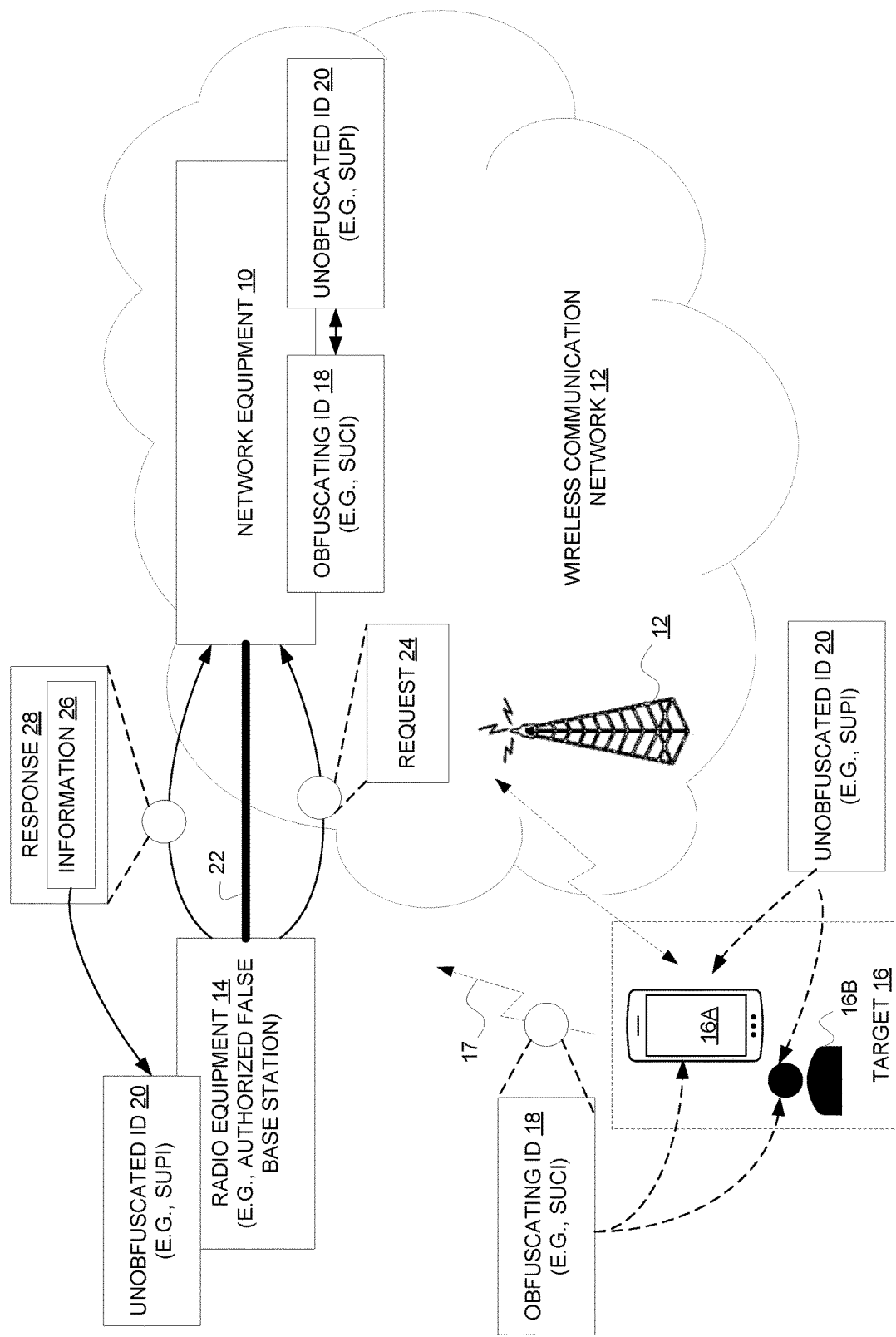
FIG. 1 is a block diagram of a wireless communication network and radio equipment according to some embodiments.

FIG. 1 shows network equipment 10 configured for use in a wireless communication network 12, e.g., a 5G network. The network equipment 10 is configured to assist radio equipment 14/authorized radio equipment, e.g., an authorized false base station, cell site simulator, or an authorized International Mobile Subscriber Identifier (IMSI) catcher. The network equipment 10 may for example assist the radio equipment 14 in performing lawful intercept of a target 16, e.g., a wireless device 16A or a subscriber 16B using the wireless device 16A. In fact, in some embodiments, the radio equipment 14 is owned or possessed by a law enforcement agency, e.g., for lawful intercept of a suspected criminal. Lawful intercept of the target 16 may nonetheless generally refer to the obtaining of wireless communication network data associated with the target 16, pursuant to lawful authority. In embodiments where this data is used to track the location of the target 16, the network equipment 10 effectively assists the radio equipment 14 in tracking the target 16.

The network equipment's assistance is needed because the wireless communication network 12 generally safeguards the privacy of wireless devices it serves, by avoiding over-the-air exposure of sensitive data associated with those devices. Sensitive data may include, for example, an identifier that remains associated with a wireless device or subscriber over a long term or permanent basis, since a malicious party could track the location of a wireless device or subscriber over time by detecting locations where the identifier is transmitted over-the-air. In this context, then, the wireless communication network 12 generally avoids over-the-air exposure of sensitive data associated with even the target 16, in order to safeguard the target 16 against attack from a malicious party.

FIG. 1 in this regard shows that the wireless communication network 12 generally only performs over-the-air transmission 17 of a so-called obfuscating identifier (ID) 18, in order to largely avoid over-the-air transmission of an unobfuscated identifier (ID) 20 associated with the target 16. The obfuscating ID 18 obfuscates the unobfuscated ID 20 associated with the target 16. The obfuscating ID 18 obfuscates the unobfuscated ID 20 in the sense that the obfuscating ID renders the unobfuscated ID 20 obscure, unclear, or unintelligible. Obfuscation in this regard may be accomplished via cryptographic means (e.g., encryption) or via non-cryptographic means (e.g., via temporary IDs or pseudonyms). Regardless, transmission of the obfuscating ID 18 over the air does not reveal the unobfuscated ID 20.

In some embodiments, for example, the unobfuscated ID 20 is a Subscription Permanent Identifier (SUPI) that uniquely, globally, and permanently identifies the subscriber 16B, at least in the wireless communication network 12. The word "uniquely" shall of course be seen in its context of this invention. From a philosophical point of view, it can perhaps not ever be guaranteed that e.g. a certain number, such as a binary number, is unique in one database or in a cluster of databases related to e.g. a home Public Land Mobile Network, but cannot be found somewhere else, such as in a completely different wireless network or in a private list, for a completely different subscriber or wireless device. A SUPI may for instance take the form of an International Mobile Subscriber Identity (IMSI) or a Network Access Identifier (NAI). In these and other embodiments, then, the unobfuscated ID 20 may be an IMSI. In yet other embodiments, the unobfuscated ID 20 may be a Permanent Equipment Identifier (PEI). Here, a PEI may be an International Mobile Equipment Identifier (IMEI), an IMEI and software version (IMEISV), a Medium Access Control address, or an Extended Unique Identifier 64 (EUI-64). In these and other embodiments, then, the unobfuscated ID 20 may be an IMEI.

In some embodiments where the unobfuscated ID 20 is a SUPI, the obfuscating ID 18 may be a Subscription Concealed Identifier (SUCI) that obfuscates the SUPI by concealing the SUPI. The SUCI may for example be or include an encrypted version of the SUPI. In other embodiments, the obfuscating ID 18 is a temporary identifier associated with the target 16, such as a Globally Unique Temporary Identifier (GUTI), a 5G GUTI, or a Serving Temporary Mobile Subscriber Identity (S-TMSI). Such a temporary identifier may be temporary in the sense that its association with the target 16 is only temporary, e.g., the temporary identifier may be used for the target for only one over-the-air transmission or for only one session. In yet other embodiments, the obfuscating ID 18 may be a pseudonym identifier associated with the target 16 which functions as a pseudonym for the unobfuscated ID 20. In either case, the temporary identifier or pseudonym identifier may unambiguously identify the target 16 but may do so without revealing the unobfuscated ID 20 associated with the target 16. For example, where the unobfuscated ID 20 is a SUPI or a PEI, the temporary identifier or the pseudonym identifier does not reveal the SUPI or the PEI.

In any event, no matter the particular form of the unobfuscated ID 20 or the obfuscating ID 18, the network's obfuscation of the unobfuscated ID 20 means that the radio equipment 14 itself cannot determine the unobfuscated ID 20 associated with the target 15. Indeed, even if the radio equipment 14 detects over-the-air transmission 17 of the obfuscating ID 18, the radio equipment 14 itself cannot determine the unobfuscated ID 20 from the obfuscating ID 18 and therefore cannot determine that the transmission 17 was associated with the target 16. This proves true not only for the radio equipment 14 itself but also for any other radio equipment (e.g., any false base stations or IMSI catchers), advantageously resulting in privacy protection for wireless devices and subscribers in the wireless communication network 12.

Notably, the wireless communication network 10 nonetheless assists the radio equipment 14 to determine the unobfuscated identifier 20 associated with the target 16, e.g., for lawful intercept purposes. The wireless communication network 10 may for example provide this assistance on the basis of the radio equipment 14 being authorized and/or authenticated by the wireless communication network 10. In this case, authorized and/or authenticated radio equipment may be assisted by the network 10 in determining an unobfuscated identifier, but unauthorized and/or unauthenticated radio equipment will not be assisted and will therefore be unable to determine such an unobfuscated identifier. Some embodiments may thereby advantageously protect against malicious privacy attacks by unauthorized radio equipment while also facilitating lawful intercept by authorized radio equipment.

More particularly in this regard, FIG. 1 shows an interface 22 between the radio equipment 14 and the network equipment 10 of the wireless communication network 12. In some embodiments, the interface 22 is protected and/or secured. The protection or security of the interface 22 can be based on one or more security protocols that run over Internet Protocol (IP), for example IPsec, Transport Layer Security (TLS), and HyperText Transfer Protocol Secure (HTTPS). Further the protection or security of the interface 22 could enable one or both of confidentiality and integrity protection. Alternatively or additionally, the radio equipment 14 and the network equipment 10 may perform a mutual authentication procedure (e.g., over the interface 22) for the radio equipment 14 to authenticate the network equipment 10 and for the network equipment 10 to authenticate the radio equipment 14. This mutual authentication could be achieved by using certificates or pre-shared keys on both sides. In some embodiments, the interface 22 is an interface configured for non-real time communication or real-time communication. The non-real time communication refers to a type of communication when the traffic from both sides (say request and response) do not have to be fairly close in terms of time. Take an analogy of an email or Short Message Service (SMS) which could be considered as examples of non-real time communication. When a sender sends email/SMS, the recipient could reply immediately or sometimes later (another hour or day or weeks). The real-time communication refers to a type of communication when the traffic from both sides (e.g. request and response) are fairly close in terms of time. Take an analogy of a voice call and video call which typically are considered as examples of real-time communication.

Regardless, with such an interface 22 established between the radio equipment 14 and the network equipment 10, the radio equipment 14 as shown sends a request 24 to the network equipment 10 over the interface 22. The request 24 in some embodiments is a request for information 26 based on which is determinable the unobfuscated ID 20 associated with the target 16. The network equipment 10 receives the request 24 and sends a response 28 to the radio equipment 14. The response 28 in some embodiments includes the requested information 26.

In one or more embodiments, for example, the requested information 26 included in the response 28 includes the unobfuscated identifier 20 itself. The radio equipment 14 in this case may determine the unobfuscated identifier 20 from the requested information 26 simply by reading the unobfuscated identifier 20 in the response 28. In other embodiments, the requested information 26 included in the response 28 does not include the unobfuscated identifier 20 itself, but instead includes information from which the unobfuscated identifier 20 can be determined. The radio equipment 14 in this case may determine the unobfuscated identifier 20 from the requested information 26 by evaluating the requested information 26 and/or combining the requested information 26 with other information.

Figure 2A:
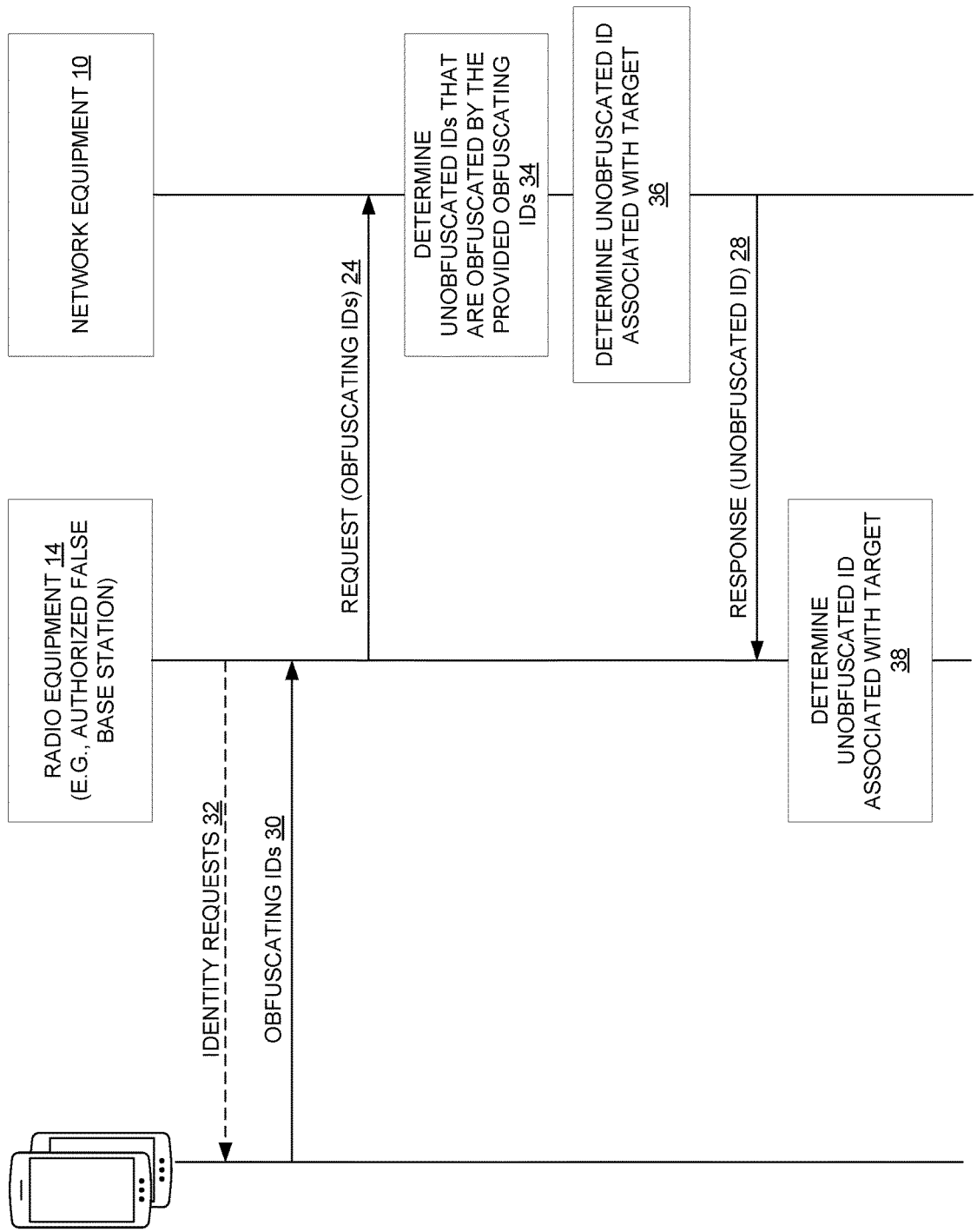
FIG. 2A is a call flow diagram of a procedure for radio equipment to determine an unobfuscated identifier associated with a target according to some embodiments.

FIG. 2A illustrates some embodiments in this regard. In the embodiments shown in FIG. 2A, the radio equipment 14 is configured to detect obfuscating IDs 30 transmitted over-the-air, e.g., where the obfuscating IDs 30 may for instance be SUCIs or 5G-GUTIs. The radio equipment 14 may for example simulate radio network equipment of the wireless communication network 12, e.g., so as to impersonate radio network equipment of the wireless communication network 12 and trick wireless devices into attempting to attach to the radio equipment 14. The radio equipment 14 in this case may request and receive the obfuscating IDs 30 from respective wireless devices that are attempting to attach to the radio equipment 14 or perform location updates. FIG. 2A for example shows the radio equipment 14 receiving the obfuscating IDs 30 in response to respective identity requests 32, e.g., as part of an attachment procedure. The identity requests 32 may for instance be Non-Access Stratum (NAS) Identity Requests. In other embodiments, by contrast, the radio equipment 14 may detect the obfuscating IDs 30 just by passively monitoring for obfuscating IDs 30 transmitted in location update messages or paging messages.

In some embodiments, the radio equipment 14 identifies the wireless communication network 10 from the detected obfuscating IDs 30. For example, the radio equipment 14 may determine the wireless communication network 10 from a Mobile Country Code (MCC), realm, and/or Mobile Network Code (MNC) included in or otherwise associated with the detected obfuscating IDs 30. Having identified the wireless communication network 10, the radio equipment 14 may identify the network equipment 10 to which a request 24 for information 26 may be sent.

In any event, the radio equipment 14 as shown includes the detected obfuscating IDs 30 in its request 24 for information 26 to the network equipment 10. In the example of FIG. 2A, the network equipment 10 determines the unobfuscated ID 20 associated with the target 16 by evaluating the obfuscating IDs 30 included in the request 24. In particular, the network equipment 10 determines the unobfuscated IDs that are obfuscated by the provided obfuscating IDs 30 (Block 34). The network equipment 10 then determines from those unobfuscated IDs the unobfuscated ID associated with the target 16 (Block 36). The network equipment 10 includes the unobfuscated ID 20 associated with the target 16 in its response 28 to the radio equipment 14. The radio equipment 14 can then determine the unobfuscated ID 20 associated with the target 16 by simply reading the response 28 (Block 38).

Figure 2B:
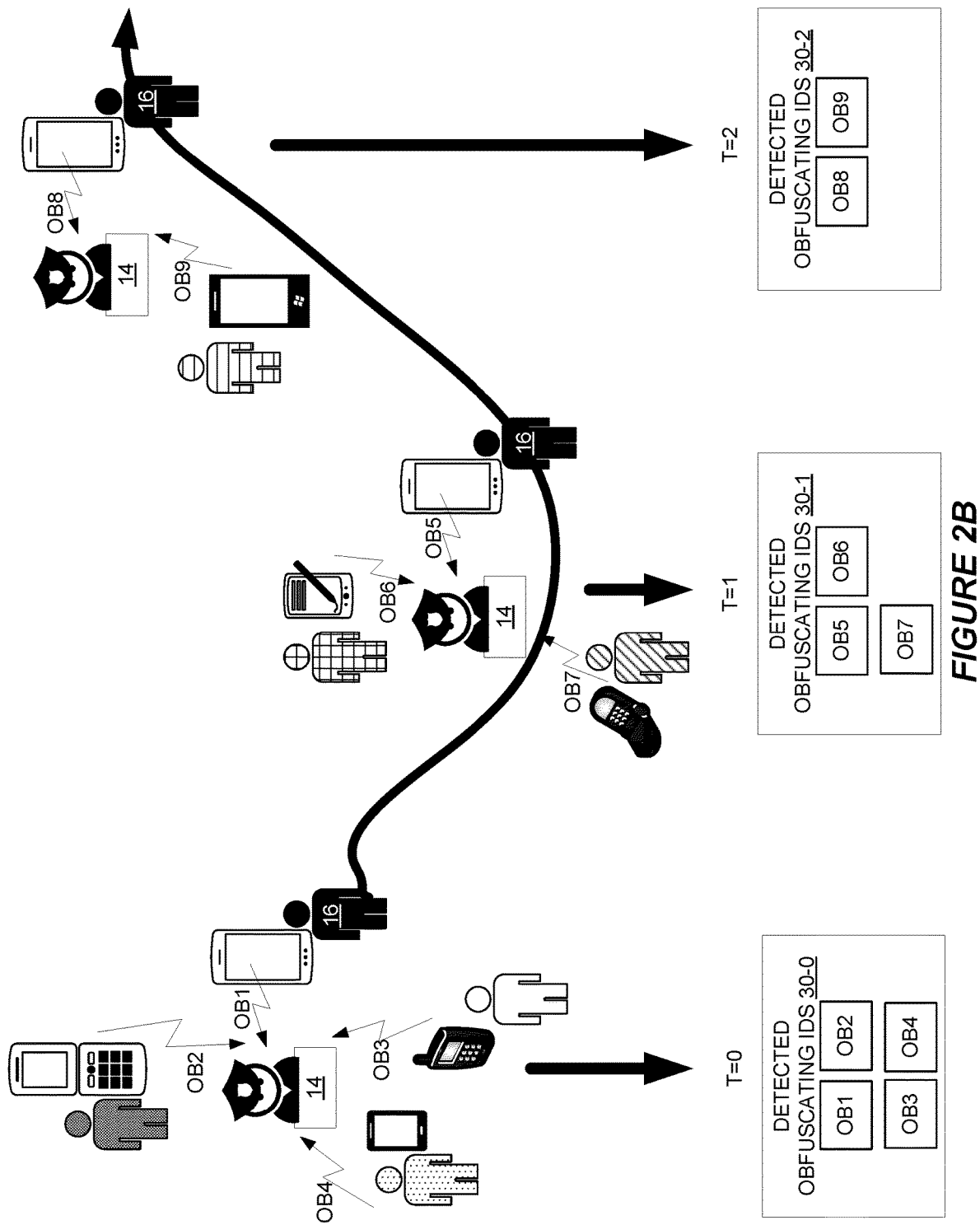
FIG. 2B-2C are block diagrams illustrating identifier detection while tracking the target 16 over time as the target 16 moves, according to some embodiments.

FIG. 2B shows one simplified example in a context where the radio equipment 14 detects obfuscating IDs 30 transmitted over-the-air as the radio equipment 14 tracks the target 16 over time. As illustrated in this simplified example, the radio equipment 14 is operated by a law enforcement agency that physically follows the target 16 as the target moves over time, in the midst of other wireless devices or subscribers that are not targets of lawful interception. At time T=0, the radio equipment 14 detects obfuscating IDs 30-0 transmitted over-the-air, including obfuscating IDs OB1, OB2, OB3, and OB4. Because these obfuscating IDs obfuscate respective unobfuscated IDs, the radio equipment 14 itself is unable to discern which obfuscating ID is associated with the target 16 and which obfuscating IDs are associated with non-targets. With the law enforcement agency continuing to physically follow the target 16, though, the radio equipment 14 at time T=1 detects obfuscating IDs 30-1 transmitted over-the-air, including obfuscating IDs OB5, OB6, and OB7. Even though the radio equipment 14 itself is still unable to discern which of these obfuscating IDs is associated with the target 16, the combined obfuscating IDs detected at times T=0 and T=1 now include two obfuscating IDs associated with the target 16 (namely, OB1 and OB5) but only one obfuscating ID associated with each non-target, assuming that none of the non-targets follow the same path as the target 16. Finally, with the law enforcement agency still following the target 16, at time T=2 the radio equipment 14 detects obfuscating IDs 30-2, including obfuscating IDs OB8 and OB9. The combined obfuscating IDs detected at times T=0, T=1, and T=2 now include three obfuscating IDs associated with the target 16, namely OB1, OB5, and OB8.

The radio equipment 14 in this example may include the combined obfuscating IDs 30-0, 30-1, and 30-2 in its request 24 to the network equipment 10.

Figure 2C:
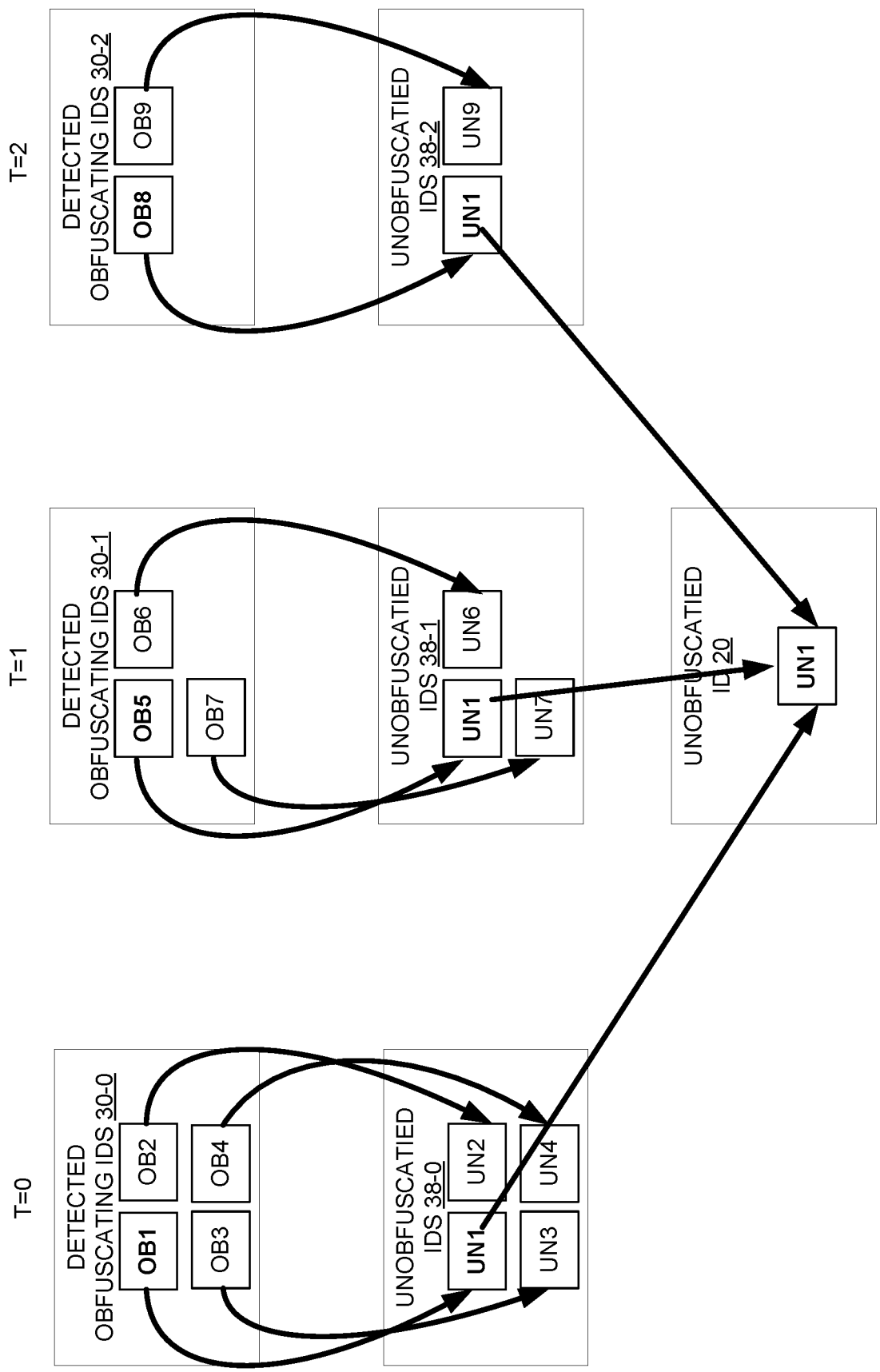

The network equipment 10 in some embodiments evaluates the obfuscating IDs 30-0, 30-1, and 30-2 to determine the obfuscating ID 20 associated with the target 16. FIG. 2C shows, for example, that the network equipment 10 determines the unobfuscated IDs that are obfuscated by the provided obfuscating IDs 30-0, 30-1, and 30-2. Where the obfuscating IDs are SUCIs, for example, the network equipment 10 deconceals those SUCIs to determine the corresponding SUPIs, or requests other network equipment to deconceal the SUCIs. Regardless, in this example, the network equipment 10 determines that unobfuscated IDs UN1, UN2, UN3, and UN4 are respectively obfuscated by obfuscating IDs OB1, OB2, OB3, and OB4, unobfuscated IDs UN1, UN6, and UN7 are respectively obfuscated by obfuscating IDs OB5, OB6, and OB7, and unobfuscated IDs UN1 and UN9 are respectively obfuscated by obfuscating IDs OB8 and OB9. The network equipment 10 may then evaluate the unobfuscated IDs UN1-UN9 to identify UN1 as being common to all of the detection times T=0, T=1, T=2; that is, UN1 is a common denominator unobfuscated ID across the times and locations at which the target 16 was tracked. This suggests that unobfuscated ID UN1 is the unobfuscated ID 20 associated with the target 16 being tracked by the radio equipment 14.

Figure 3:
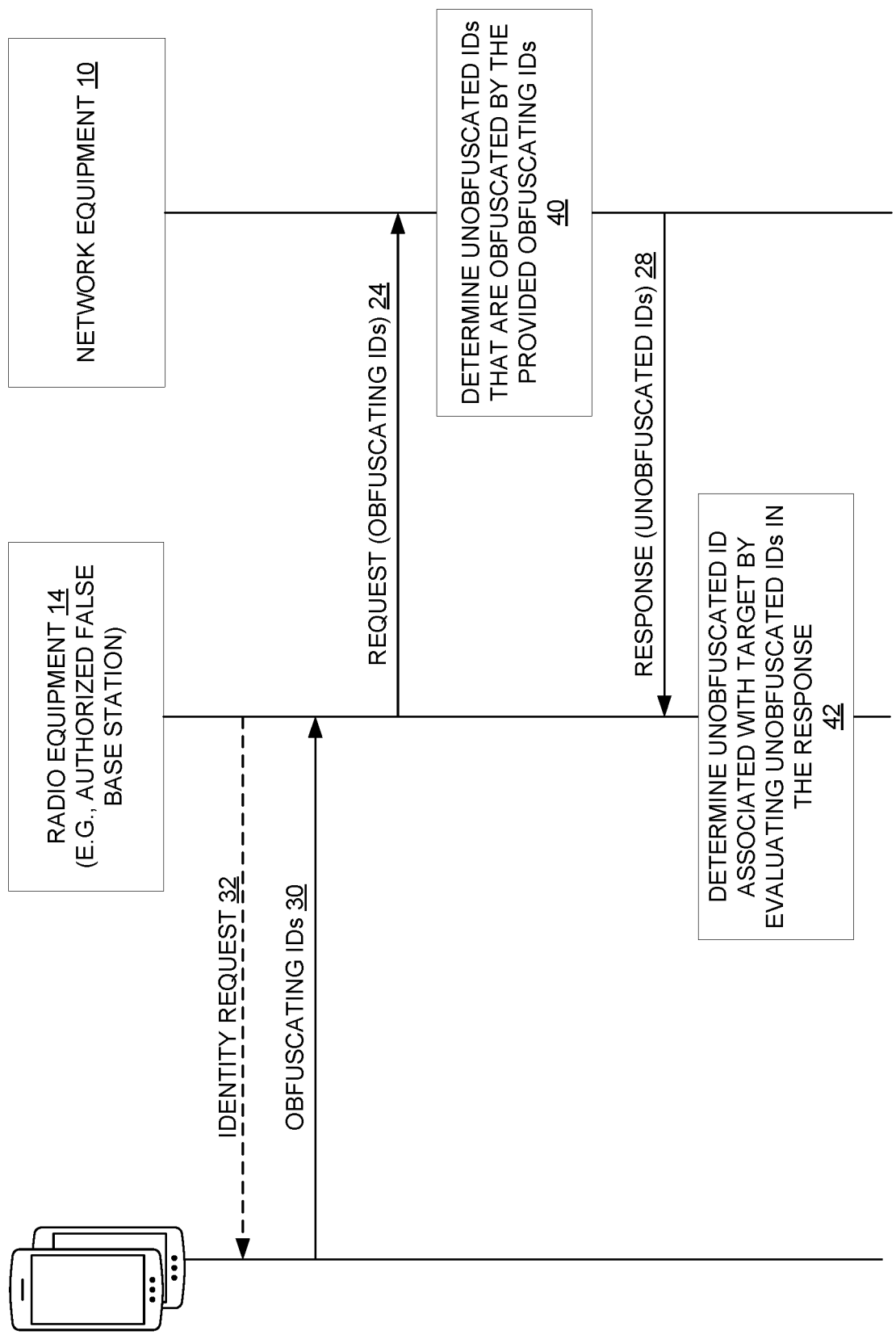
FIG. 3 is a call flow diagram of a procedure for radio equipment to determine an unobfuscated identifier associated with a target according to other embodiments.

Note that while the network equipment 10 in the above embodiments performed the evaluation to determine the unobfuscated ID 20 associated with the target 16, the radio equipment 14 may perform that evaluation in other embodiments. FIG. 3 shows one example.

As shown in FIG. 3, the network equipment 10 just determines the unobfuscated IDs that are obfuscated by the provided obfuscating IDs 30 (Block 40). The network equipment 10 in this case does not then determine from those unobfuscated IDs the unobfuscated ID associated with the target 16. Rather, the network equipment 10 includes the determined unobfuscated IDs in the response 28 back to the radio equipment 14. The radio equipment 14 can then determine the unobfuscated ID 20 associated with the target 16 by evaluating the unobfuscated IDs included in the response 28 (Block 42). The radio equipment 14 may for example do so in a way similar to that described above for the network equipment 10, e.g., by identifying which unobfuscated ID is common to all of the detection times.

Figure 4:
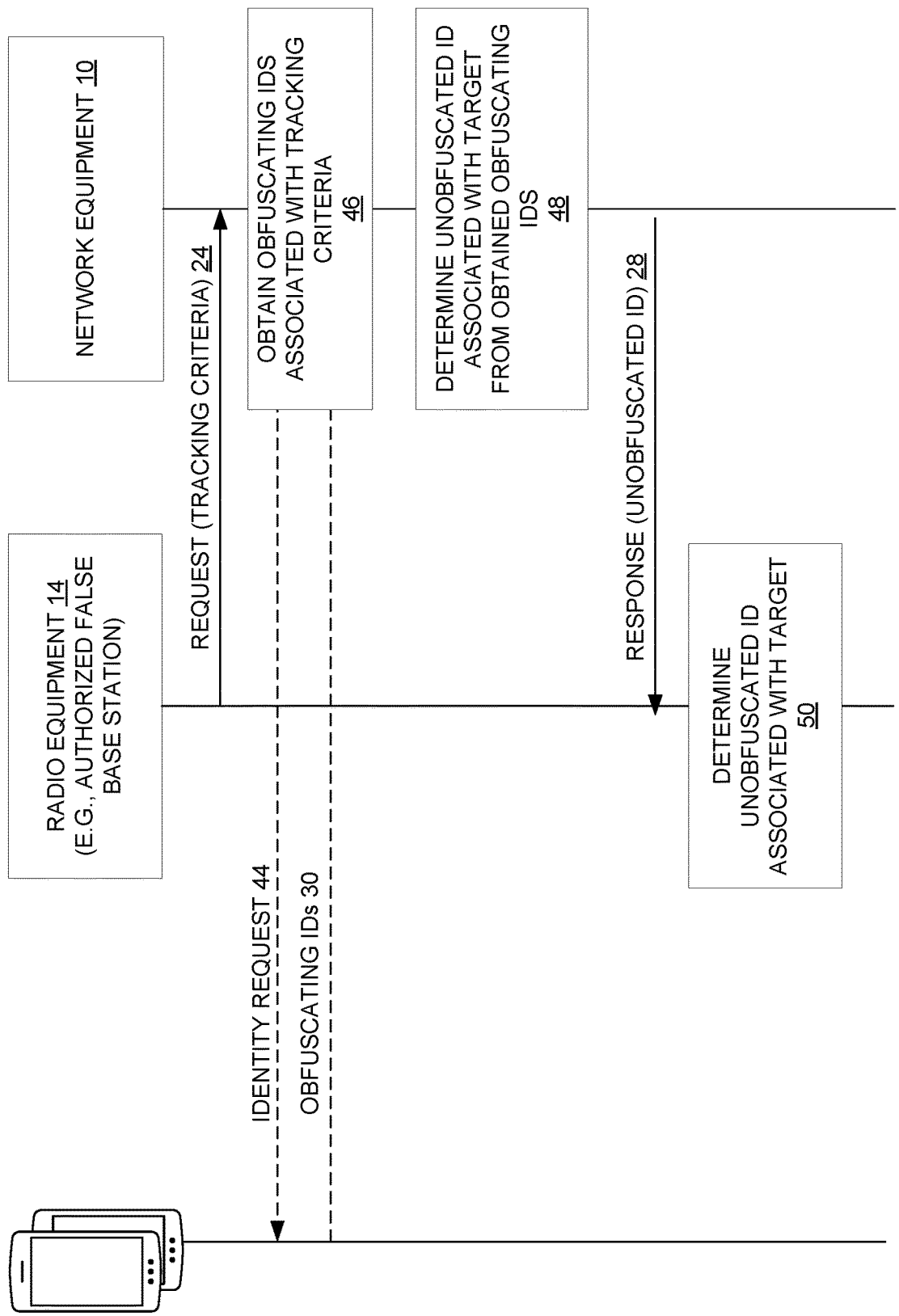
FIG. 4 is a call flow diagram of a procedure for radio equipment to determine an unobfuscated identifier associated with a target according to yet other embodiments.

FIG. 4 illustrates yet other embodiments herein. As shown, the request 24 that the radio equipment 14 sends to the network equipment 10 does not include obfuscating IDs 30 detected by the radio equipment 14. Instead, the request 24 includes criteria describing tracking of the target 16 by the radio equipment 14. The criteria may describe for instance where and when the target 16 has been or will be tracked by the radio equipment 14. The criteria may describe where the target 16 has been or will be tracked in terms of geographical coordinates, cell identifier(s), tracking area identifiers, radio network equipment identifiers, or any other area descriptor. The criteria may describe when the target 16 has been or will be tracked in terms of a timestamp, time range, time of day information, or the like. Regardless, the network equipment 10 then obtains obfuscating IDs 30 associated with the tracking criteria (Block 46). In some embodiments in this regard, the network equipment 10 may already have obfuscating IDs 30 associated with the tracking criteria, in which case the network equipment 10 may obtain the obfuscating IDs from memory. For example, the network equipment 10 may already have track of GUTIs that are in the path the target 16 follows. In other embodiments, though, the request 24 may trigger the network equipment 10 to issue legitimate requests 44 for obfuscating IDs at times when and in areas where the radio equipment 14 is tracking the target 16. Regardless, having obtained the obfuscating IDs 30 associated with the tracking criteria, the network equipment 10 may operate as described above to determine from those obfuscating IDs 30 the unobfuscated ID 20 associated with the target 16 (Block 48). In this case, the network equipment 10 includes the unobfuscated ID 20 in its response 28 to the request 24. And the radio equipment 14 determines the unobfuscated ID 20 associated with the target 16 by simply reading the response 28 (Block 50).

Figure 5:
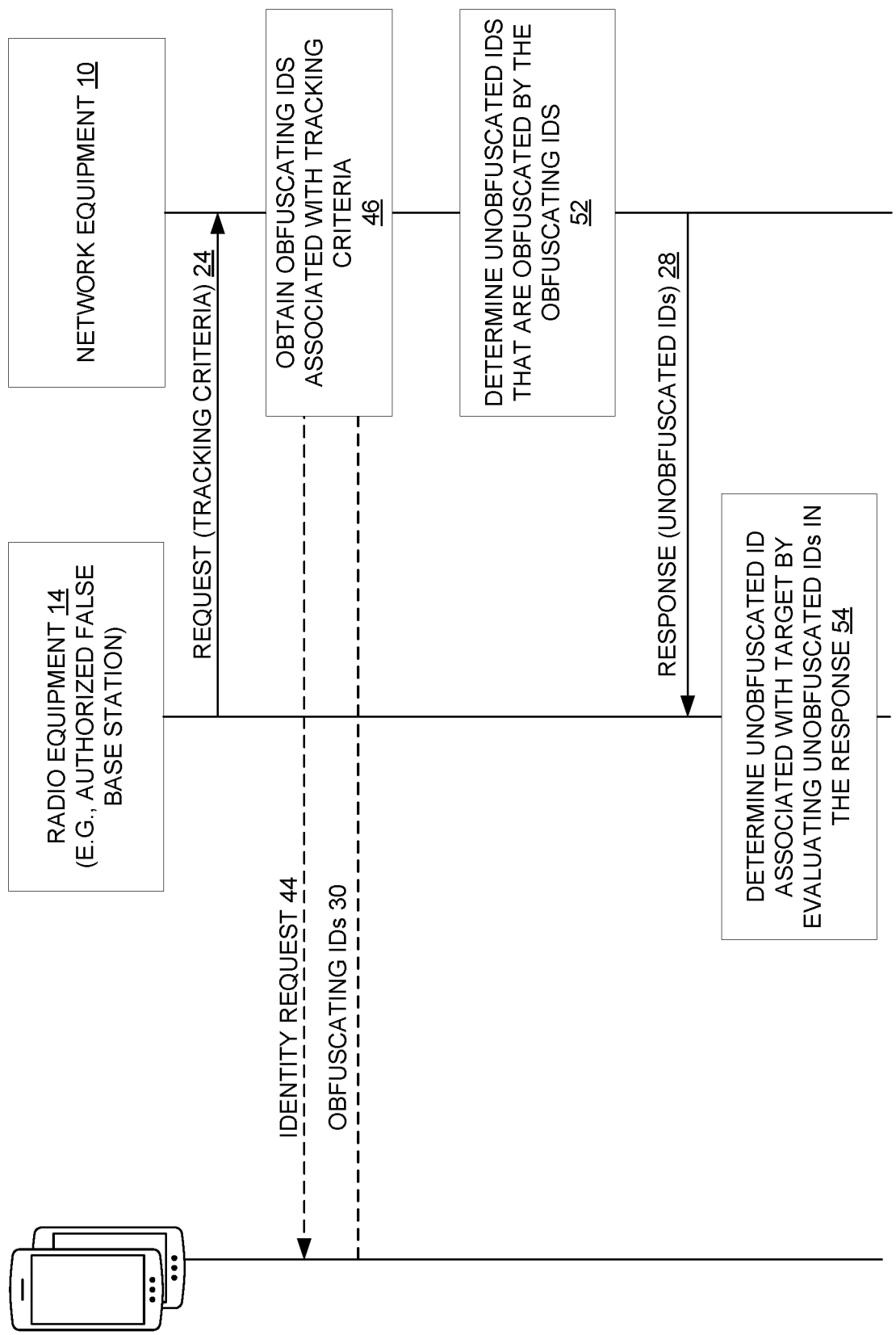
FIG. 5 is a call flow diagram of a procedure for radio equipment to determine an unobfuscated identifier associated with a target according to still other embodiments.

FIG. 5 illustrates similar embodiments where the radio equipment 14, not the network equipment 10, determines the unobfuscated ID 20 associated with the target 16. As shown, after obtaining the obfuscating IDs 30 associated with the tracking criteria (Block 46), the network equipment 10 just determines the unobfuscated IDs that are obfuscated by the provided obfuscating IDs 30 (Block 52). The network equipment 10 in this case does not then determine from those unobfuscated IDs the unobfuscated ID associated with the target 16. Rather, the network equipment 10 includes the determined unobfuscated IDs in the response 28 back to the radio equipment 14. The radio equipment 14 can then determine the unobfuscated ID 20 associated with the target 16 by evaluating the unobfuscated IDs included in the response 28 (Block 54). The radio equipment 14 may for example do so in a way similar to that described above for the network equipment 10, e.g., by identifying which unobfuscated ID is common to all of the detection times.

Note that in some embodiments, the radio equipment 14 may need to account for whether detected obfuscating IDs 30 are domestic (associated with a subscriber of a home network) or roaming IDs. The radio equipment 14 may need to use at least some parts of the obfuscating IDs to determine whom the network equipment 10 belongs to. This may be necessary because the radio equipment 14 may have multiple interfaces 22 with multiple network equipment 10 that belong to different wireless communication networks. At least some parts of the obfuscating IDs (for example, MCC, MNC, realm and domain name) could be used by the radio equipment 14 to determine that the obfuscating IDs are domestic IDs, meaning belonging to the wireless communication network that operates in the same country/state as the radio equipment 14. This determination could also help in further identifying which network equipment 10 and which interface 22 the radio equipment 14 needs to use, for example by using the MNC or realm or domain name. If the radio equipment 14 determines that the obfuscating IDs are roaming IDs, it means that the IDs belong to the wireless communication network that operates in the different country than the radio equipment 14. In that case, the radio equipment 14 may not have a direct interface 22 with a foreign network equipment that belongs to the wireless communication network in another country. So, the radio equipment 14 may choose one of the network equipment and one of interfaces 22 so that the chosen network equipment could in turn interact with the foreign network equipment and respond to the radio equipment in non-real time or real-time.

Note further that the response 28 according to some embodiments may also include additional information associated with the target 16, e.g., other identifying information associated with the target 16, information describing current or historical locations of the target 16, communications transmitted or received by the target 16, etc. Alternatively or additionally, the radio equipment 14 in some embodiments may detect other information as well, including route, cell identifiers, GPS locations, date, time, WiFi access point names, etc.

Note also that, in some embodiments, the radio equipment 14 is external to the wireless communication network 12. The radio equipment 14 in these and other embodiments is thereby distinguishable from equipment in the wireless communication network 12 that requests or otherwise accesses unobfuscated IDs. The radio equipment 14 for example is distinguishable from network equipment in the wireless communication network 10, e.g., distinguishable from core network equipment that implements an Access and Mobility Function (AMF). In any event, although the radio equipment 14 is external to the wireless communication network 12 in some embodiments, the operator of the wireless communication network 12 may nonetheless provide the radio equipment 14, e.g., to a law enforcement agency.

Note also that the radio equipment 14 as used herein refers to any equipment that is configured to transmit and/or receive a radio signal, e.g., via radio frequency (RF) circuitry and/or via a software defined radio (SDR). An SDR in this regard transposes an entire slice of radio spectrum into a frequency low enough that the analog radio signal can be digitalized. This means that any kind of radio protocol can be implemented entirely in software, using standard computers (e.g. a laptop or a Raspberry Pi). In some embodiments, the radio equipment 14 is configured for or capable of simulating radio network equipment in the wireless communication network 10, e.g., so as to take the form of a false base station or IMSI catcher.

Note further that the network equipment 10 herein may refer to any equipment in the wireless communication network 12 configured for or capable of assisting the radio equipment 14 as described above. In embodiments where the wireless communication network 12 has a service-based architecture (SBA), at least in the core network, the network equipment 10 may refer to (i) a single hardware unit that implements a single network function (NF) for assisting the radio equipment 14; (ii) a single hardware unit that implements multiple NFs that collectively assist the radio equipment 14 as described above; or (iii) a set of two or more hardware units that implement respective NFs for collectively assisting the radio equipment 14 as described above.

Consider, for example, embodiments that exploit a protected service-based interface like Nudm. In this case, the radio equipment 14 may act like an application function (AF), and the network equipment 10 may implement a unified data management (UDM) function and/or a Subscription Identifier De-concealing Function (SIDF). In other embodiments, the network equipment 10 may implement a new special network function for this purpose.

Figure 6:
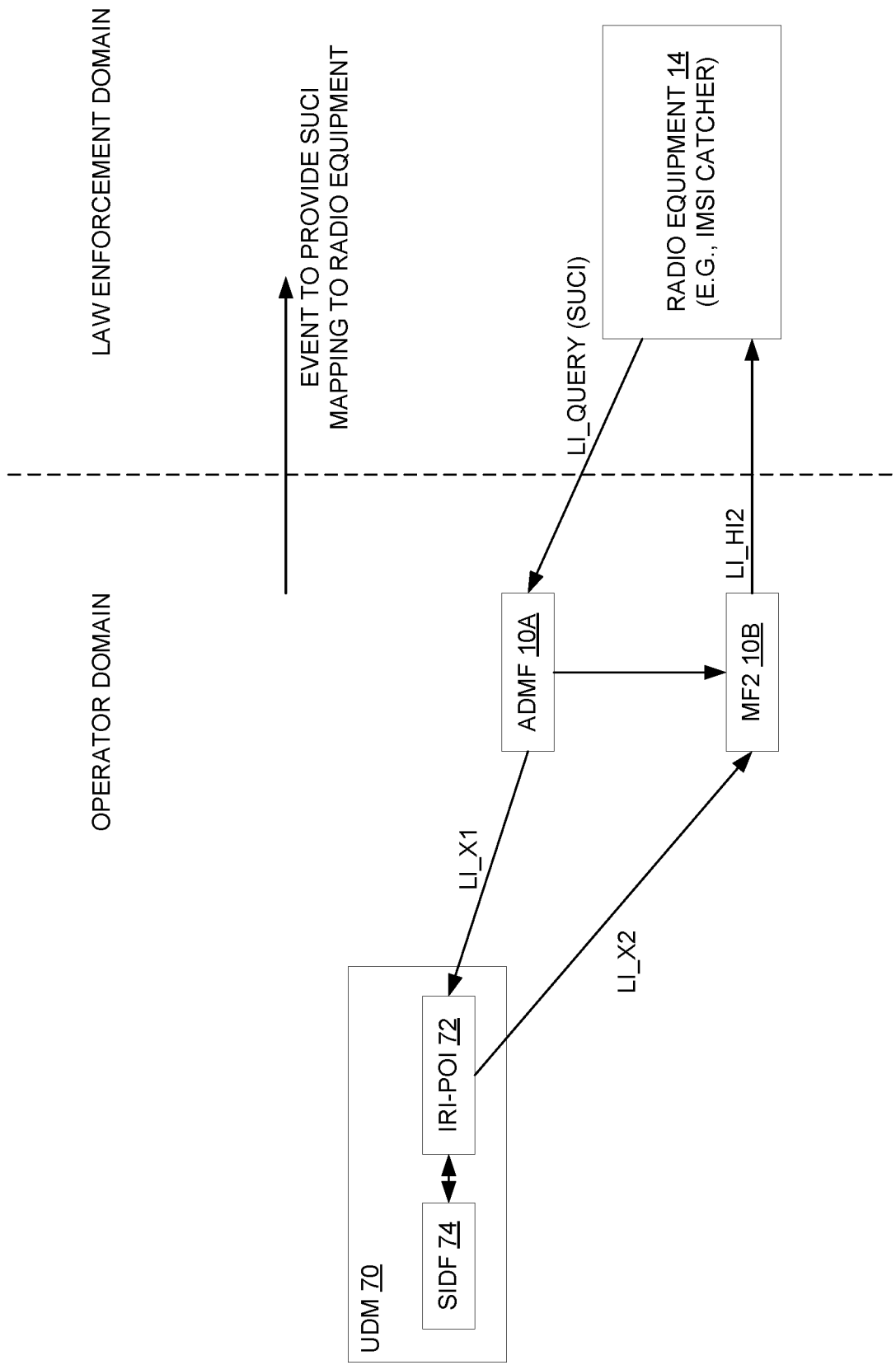
FIG. 6 is a service-based architecture over which the radio equipment and network equipment communicate according to some embodiments.

Other embodiments herein re-use the 3GPP Lawful Intercept (LI) architecture 10 already specified in 3GPP TS 33.127 v16.2.0 and 33.128 v16.1.0. Some embodiments however add the ability to handle real time queries. FIG. 6 shows one example.

In FIG. 6, the radio equipment 14 (e.g., an authorized IMSI catcher) operates in a law enforcement domain associated with a law enforcement agency. The network equipment 10 that assists the radio equipment with lawful intercept of the target 16 takes the form of a Lawful Intercept Administration Function (ADMF) 10A and a Mediation Function 2 (MF2) 10B. The ADMF 10A is the LI Administration function defined in 3GPP 33.127 v16.2.0. The MF2 10B is the Mediation function 2 defined in TS 33.127 v16.2.0.

In particular, after the radio equipment 14 receives a NAS Identity Response from a User Equipment so as to obtain a SUCI, the radio equipment 14 sends a query "Translate SUCI" to the ADMF 10A using a LI_QUERY interface, e.g., which may be an interface for real-time communication. The query includes the SUCI. The query may also include other information required for authentication, authorization, and/or legal compliance purposes, e.g., time stamp and geoposition of the radio equipment. The Translate SUCI query may use a unique Lawful Interception Identifier (LIID), e.g., as defined in 3GPP TS 33.128 v16.1.0, to uniquely identify the query.

The ADMF 10A in some embodiments uses the routing identifier in the SUCI to identify the Unified Data Management (UDM) function 70 that is handling the subscriber. In some embodiments, the ADMF 10A receives the information from the Network Repository Function (NRF) that may be needed, e.g., such as the Public Land Mobile Network (PLMN) ID, the Internet Protocol (IP) address of the UDM service interface, etc. The ADMF 10A may also already be connected to all of the relevant UDM nodes, e.g., via an Intercept Related Information (IRI) Point of Interception (POI) 10B. 3GPP TS 33.127 v16.2.0.

The ADMF 10A may contact the IRI-POI 10B inside the UDM 70 over an X1 interface. The request may include the LIID, e.g., as already required for the LI_X1. A special identifier for the SUCI may need to be added to the LI_X1 interface. In any event, the IRI-POI inside the UDM 70 may translate the SUCI to SUPI, or request a Subscription Identifier Deconcealing Function (SIDF) to do so, and provide the SUPI to the MF2 via the LI-X2 interface. The MF2 may then forward the event to the radio equipment 14, via the LI-HI2 interface. Note that the required information is already defined in the LI-X2 and LI_HI2 interfaces. In particular, the LIID is already used for correlation purposes between different interfaces.

The embodiments shown in FIG. 6 may have one or more of the following advantages. The ADMF 10A is already used as a secure management point for sensitive requests from law enforcement. Also, the ADMF 10A is already connected to the UDM 70. Furthermore, the ADMF 10A receives a copy of the information that the Network Resource Function (NRF) has received about the UDM 70. This can be useful to identify the correct UDM. Furthermore, the LI architecture is already handling confidential information in a secure way, compliant to the 3GPP standards and national regulations in the relevant countries.

Note that the LI_X2 and LI_HI2 applications include information that may be needed due to legal compliance reasons (such as for example time stamp, identity/location of the UDM 70, identity/location of the MF2 10B, known last position of the SUPI). Other relevant known identities could also be provided from the subscriber record.

Nevertheless, a challenge with this architecture in FIG. 6 is that the volume of requests to the ADMF 10A may increase significantly. In that case, some embodiments may operate in one or more of the following ways. Given the requirement in terms of real-time performance in some embodiments, a new functional unit inside the ADMF 10A may handle the LI_QUERY interface. Note that similar performance is required in other domains, for example in wireline broadband interception where a dynamic activation of the interception is required (e.g. in order to implement ETSI 102 232-3). The ADMF 10A for example could include a dedicated module that can receive all Radius registrations.

Alternatively or additionally, the LI_QUERY interface may be generic so that it can be transported over a wide range of networks and protocols. Some embodiments use the mission critical, low latency communication offered by the 5G network for the connection itself. This would be ideal for portable IMSI catchers Alternatively or additionally, if Multi-access Edge Computing (MEC) or other edge computing technology is available, the radio equipment 14 may even be implemented as an MEC application In some embodiments, batch processing for non-real time communication could also be added, whereby several SUCI can be requested in one request.

Figure 7:
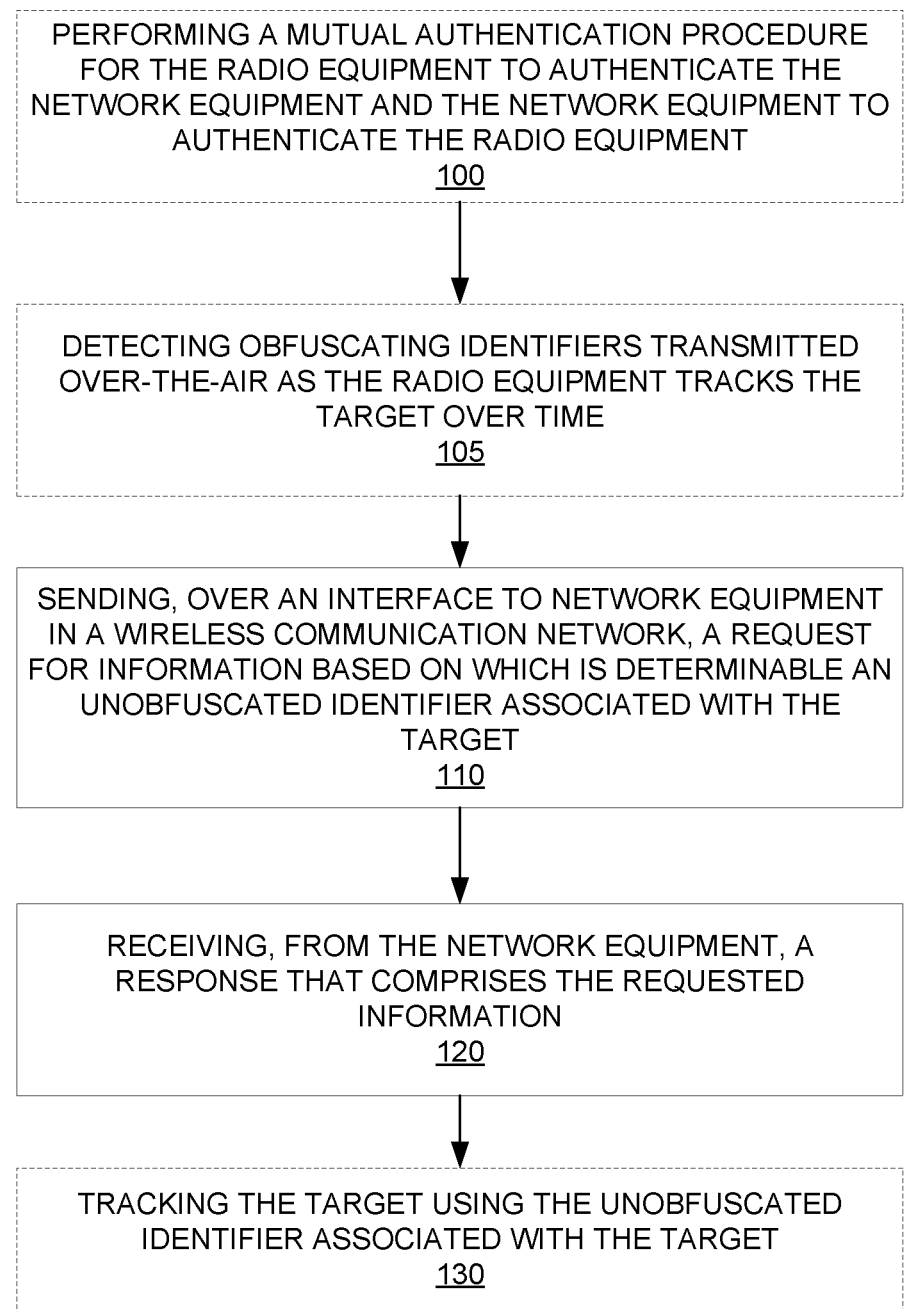
FIG. 7 is a logic flow diagram of a method performed by radio equipment according to some embodiments.

In view of the above modifications and variations, FIG. 7 depicts a method performed by radio equipment 14 in accordance with particular embodiments. The method may be for lawful intercept of a target 16, which may include tracking of the target 16. The method as shown includes sending, over an interface 22 to network equipment 10 in a wireless communication network 12, a request 24 for information 26 based on which is determinable an unobfuscated identifier 20 associated with the target 16 (Block 110). In some embodiments, the unobfuscated identifier 20 is obfuscated by an obfuscating identifier 18 associated with the target 16. The method as show also include receiving, from the network equipment 10, a response 28 that comprises the requested information 26 (Block 120).

In some embodiments, the method further comprises performing a mutual authentication procedure for the radio equipment 14 to authenticate the network equipment 10 and the network equipment 10 to authenticate the radio equipment 14 (Block 100). In fact, in some embodiments, sending of the request 24 and/or receiving of the response 28 is contingent on successful mutual authentication, e.g., so that only authorized parties can determine the unobfuscated identifier 20 associated with the target 16.

Alternatively or additionally, the method may further comprise detecting obfuscating identifiers 30 transmitted over-the-air as the radio equipment 14 tracks the target 16 over time (Block 105). In one or more embodiments, for example, the radio equipment 14 may simulate radio network equipment of the wireless communication network 10, and request and receive the obfuscating identifiers 30 from respective wireless devices that are attempting to attach to the radio network equipment or perform location updates. Or, the radio equipment 14 may passively monitor for obfuscating identifiers 30 transmitted in location update messages or paging messages. Regardless, in this case, the request 24 may include the detected obfuscating identifiers 30.

Alternatively or additionally, the method may include tracking the target 16 using the unobfuscated identifier 20 associated with the target 16 (Block 130).

Figure 8:
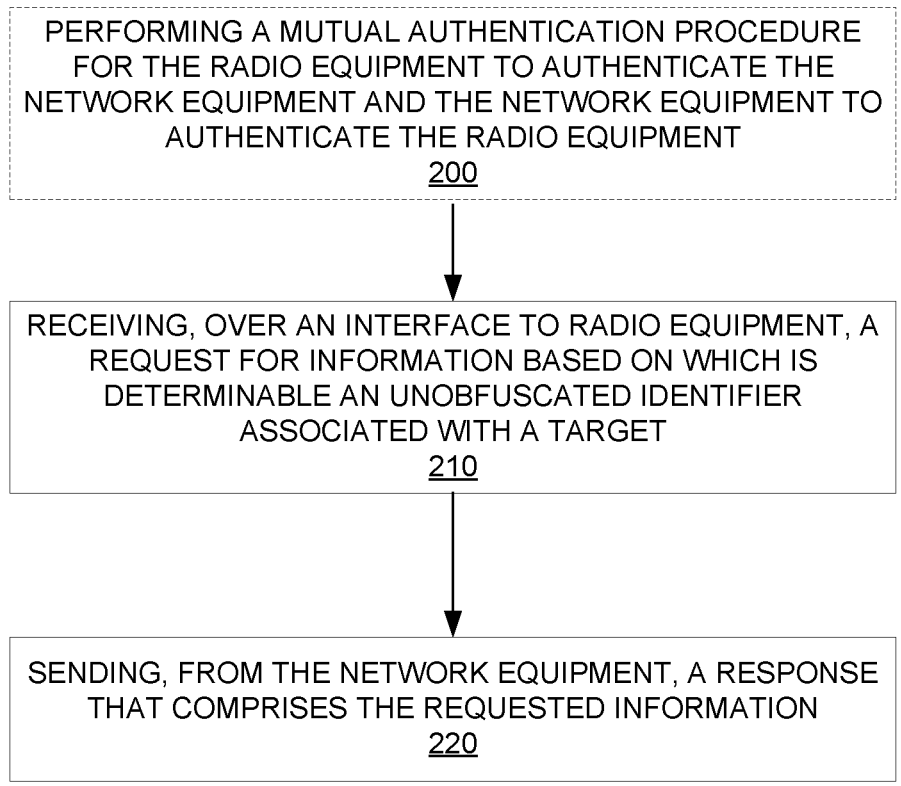
FIG. 8 is a logic flow diagram of a method performed by network equipment according to some embodiments.

FIG. 8 depicts a corresponding method performed by network equipment 10 in a wireless communication network 12 in accordance with other particular embodiments. The method includes receiving, over an interface 22 with radio equipment 14, a request 24 for information 26 based on which is determinable an unobfuscated identifier 20 associated with a target 16 being tracked by the radio equipment 14 (Block 210). In some embodiments, the unobfuscated identifier 20 is obfuscated by an obfuscating identifier 18 associated with the target 16. The method may also include sending, from the network equipment 10 to the radio equipment 14, a response 28 that includes the requested information 26 (Block 220).

In some embodiments, the method further comprises performing a mutual authentication procedure for the radio equipment 14 to authenticate the network equipment 10 and the network equipment 10 to authenticate the radio equipment 14 (Block 200). In fact, in some embodiments, receiving of the request 24 and/or sending of the response 28 is contingent on successful mutual authentication, e.g., so that only authorized parties can determine the unobfuscated identifier 20 associated with the target 16.

The above embodiments advantageously safeguard the privacy of a wireless device or subscriber, while also facilitating lawful intercept by an authorized party. Other embodiments herein, however, temporarily sacrifice the privacy of a wireless device or subscriber, as needed to facilitate lawful intercept of a target. In one or more such embodiments, for example, the wireless communication network 12 causes each of one or more wireless devices, including the wireless device 16A associated with the target 16, to temporarily stop privacy protecting identifying information, or to reduce the extent of such privacy protection. Even though this may sacrifice privacy protection for one or more wireless devices or subscribers besides the target 16, the embodiments nonetheless advantageously enable determination of identifying information associated with the target 16. This privacy sacrifice may be justified for example when saving the lives of hundreds of people is more important than preserving the privacy of 2 or 3 persons.

Consider an example in the context of the privacy protection provided by concealing SUPI via SUCI. In some embodiments, one or more operators may turn off SUPI privacy, e.g., by configuring wireless devices to use the so-called "null-scheme" for SUCI calculation. The operator(s) may turn off this SUPI privacy selectively in times and/or areas when and/or where the target 16 is being tracked, e.g., by law enforcement. In some embodiments, a law enforcement agency associated with the radio equipment 14 may ask the operator(s) to do so and provide necessary information about routes, times, etc. for authentication. In fact, some embodiments exploit the interface 22 described above for such interaction between the radio equipment 14 and the wireless communication network 12, instead of or in addition to that described above with respect to FIG. 1. In any event, with SUPI privacy now turned off, the radio equipment 14 may now work as it would have without SUPI privacy, e.g., pre-5G.

Note that these embodiments may mean that a "few" users will be exposed for "some" time in "localized" areas. This is better than sacrificing the privacy of all users in all areas. This argument becomes clear if it is compared to a situation where a government demands that SUPI privacy shall not be used anywhere, meaning that the whole general public is under privacy threat. Accordingly, instead of turning off privacy protection for millions of users, it could be still acceptable that privacy for a few users (e.g., tens or hundreds) is momentarily turned off. Mind that privacy can be turned back on again after the purpose is served.

Embodiments herein also include corresponding apparatuses. Embodiments herein for instance include radio equipment 14 configured to perform any of the steps of any of the embodiments described above for the radio equipment 14.

Embodiments also include radio equipment 14 comprising processing circuitry and power supply circuitry. The processing circuitry is configured to perform any of the steps of any of the embodiments described above for the radio equipment 14. The power supply circuitry is configured to supply power to the radio equipment 14.

Embodiments further include radio equipment 14 comprising processing circuitry. The processing circuitry is configured to perform any of the steps of any of the embodiments described above for the radio equipment 14. In some embodiments, the radio equipment 14 further comprises radio communication circuitry.

Embodiments further include radio equipment 14 comprising processing circuitry and memory. The memory contains instructions executable by the processing circuitry whereby the radio equipment 14 is configured to perform any of the steps of any of the embodiments described above for the radio equipment 14.

Embodiments herein also include network equipment 10 configured to perform any of the steps of any of the embodiments described above for the network equipment 10.

Embodiments also include network equipment 10 comprising processing circuitry and power supply circuitry. The processing circuitry is configured to perform any of the steps of any of the embodiments described above for the network equipment 10. The power supply circuitry is configured to supply power to the network equipment 10.

Embodiments further include network equipment 10 comprising processing circuitry. The processing circuitry is configured to perform any of the steps of any of the embodiments described above for the network equipment 10. In some embodiments, the network equipment 10 further comprises communication circuitry.

Embodiments further include a radio network node comprising processing circuitry and memory. The memory contains instructions executable by the processing circuitry whereby the network equipment 10 is configured to perform any of the steps of any of the embodiments described above for the network equipment 10.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 9:
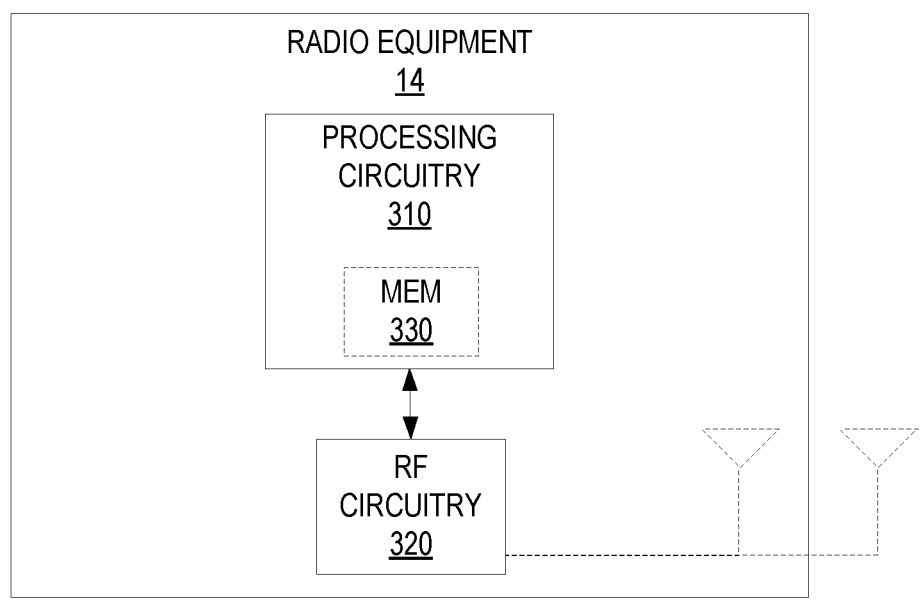
FIG. 9 is a block diagram of radio equipment according to some embodiments.

FIG. 9 for example illustrates radio equipment 14 as implemented in accordance with one or more embodiments. As shown, the radio equipment 14 includes processing circuitry 310 and radio frequency (RF) circuitry 320. The RF circuitry 320 is configured to transmit and/or receive a radio signal. Reception and/or transmission of a radio signal may occur via one or more antennas that are either internal or external to the radio equipment 14. The processing circuitry 310 is configured to perform processing described above, e.g., in FIG. 7, such as by executing instructions stored in memory 330. The processing circuitry 310 in this regard may implement certain functional means, units, or modules.

Figure 10:
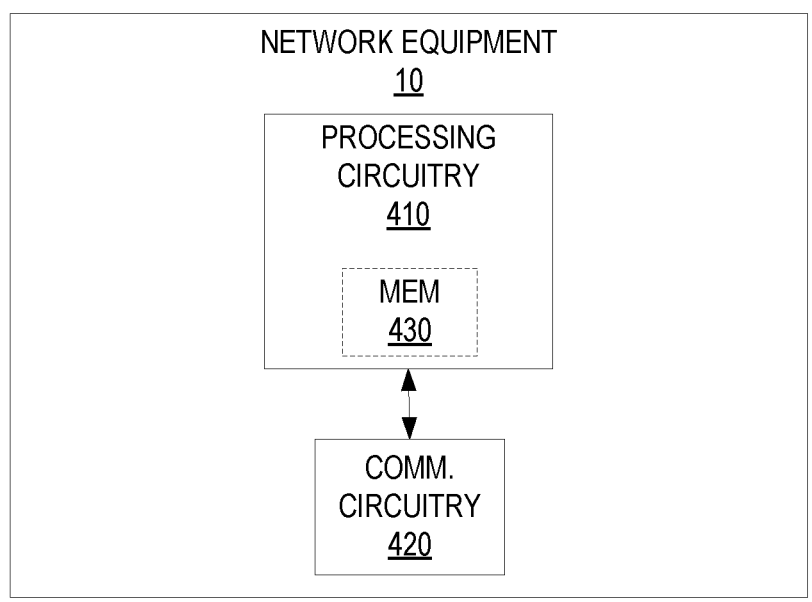
FIG. 10 is a block diagram of network equipment according to some embodiments.

FIG. 10 illustrates network equipment 10 as implemented in accordance with one or more embodiments. As shown, the network equipment 10 includes processing circuitry 310 and communication circuitry 320. The communication circuitry 320 is configured to transmit and/or receive information to and/or from one or more other nodes, e.g., via any communication technology. The processing circuitry 310 is configured to perform processing described above, e.g., in FIG. 8, such as by executing instructions stored in memory 330. The processing circuitry 310 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Figure 11:
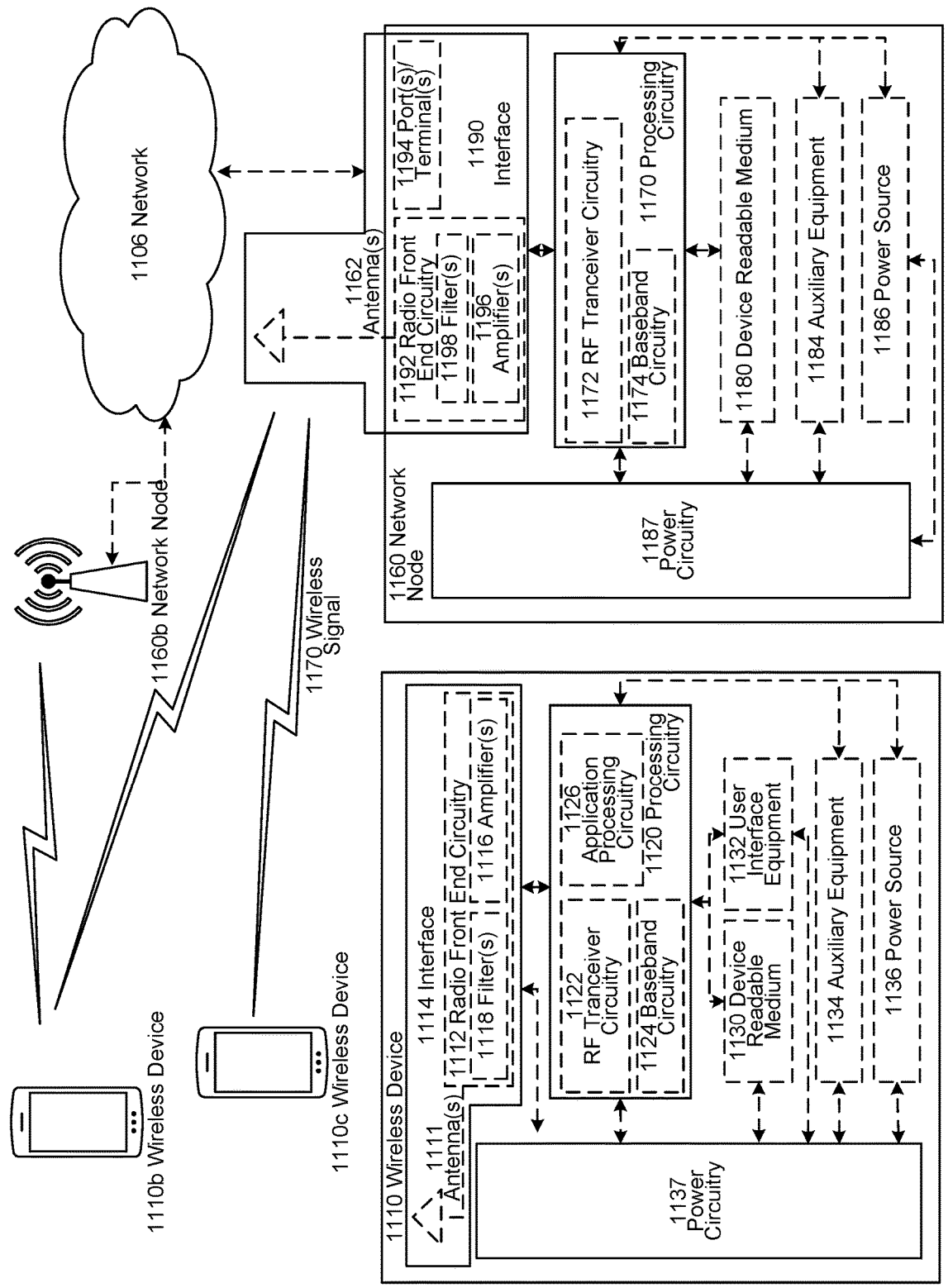
FIG. 11 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 11. For simplicity, the wireless network of FIG. 11 only depicts network 1106, network nodes 1160 and 1160b, and WDs 1110, 1110b, and 1110c. In practice, a wireless network may further include any additional elements suitable to support communication between wireless devices or between a wireless device and another communication device, such as a landline telephone, a service provider, or any other network node or end device. Of the illustrated components, network node 1160 and wireless device (WD) 1110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 11, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 11 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1160 are depicted as single boxes located within a larger box, or nested within multiple boxes, in practice, a network node may comprise multiple different physical components that make up a single illustrated component (e.g., device readable medium 1180 may comprise multiple separate hard drives as well as multiple RAM modules).

Similarly, network node 1160 may be composed of multiple physically separate components (e.g., a NodeB component and a RNC component, or a BTS component and a BSC component, etc.), which may each have their own respective components. In certain scenarios in which network node 1160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1160 may be configured to support multiple radio access technologies (RATs). In such embodiments, some components may be duplicated (e.g., separate device readable medium 1180 for the different RATs) and some components may be reused (e.g., the same antenna 1162 may be shared by the RATs). Network node 1160 may also include multiple sets of the various illustrated components for different wireless technologies integrated into network node 1160, such as, for example, GSM, WCDMA, LTE, NR, WiFi, or Bluetooth wireless technologies. These wireless technologies may be integrated into the same or different chip or set of chips and other components within network node 1160.

Processing circuitry 1170 is configured to perform any determining, calculating, or similar operations (e.g., certain obtaining operations) described herein as being provided by a network node. These operations performed by processing circuitry 1170 may include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1160 components, such as device readable medium 1180, network node 1160 functionality. For example, processing circuitry 1170 may execute instructions stored in device readable medium 1180 or in memory within processing circuitry 1170. Such functionality may include providing any of the various wireless features, functions, or benefits discussed herein. In some embodiments, processing circuitry 1170 may include a system on a chip (SOC).

In some embodiments, processing circuitry 1170 may include one or more of radio frequency (RF) transceiver circuitry 1172 and baseband processing circuitry 1174. In some embodiments, radio frequency (RF) transceiver circuitry 1172 and baseband processing circuitry 1174 may be on separate chips (or sets of chips), boards, or units, such as radio units and digital units. In alternative embodiments, part or all of RF transceiver circuitry 1172 and baseband processing circuitry 1174 may be on the same chip or set of chips, boards, or units In certain embodiments, some or all of the functionality described herein as being provided by a network node, base station, eNB or other such network device may be performed by processing circuitry 1170 executing instructions stored on device readable medium 1180 or memory within processing circuitry 1170. In alternative embodiments, some or all of the functionality may be provided by processing circuitry 1170 without executing instructions stored on a separate or discrete device readable medium, such as in a hard-wired manner. In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160, but are enjoyed by network node 1160 as a whole, and/or by end users and the wireless network generally.

Device readable medium 1180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1170. Device readable medium 1180 may store any suitable instructions, data or information, including a computer program, software, an application including one or more of logic, rules, code, tables, etc. and/or other instructions capable of being executed by processing circuitry 1170 and, utilized by network node 1160. Device readable medium 1180 may be used to store any calculations made by processing circuitry 1170 and/or any data received via interface 1190. In some embodiments, processing circuitry 1170 and device readable medium 1180 may be considered to be integrated.

Interface 1190 is used in the wired or wireless communication of signalling and/or data between network node 1160, network 1106, and/or WDs 1110. As illustrated, interface 1190 comprises port(s)/terminal(s) 1194 to send and receive data, for example to and from network 1106 over a wired connection. Interface 1190 also includes radio front end circuitry 1192 that may be coupled to, or in certain embodiments a part of, antenna 1162. Radio front end circuitry 1192 comprises filters 1198 and amplifiers 1196. Radio front end circuitry 1192 may be connected to antenna 1162 and processing circuitry 1170. Radio front end circuitry may be configured to condition signals communicated between antenna 1162 and processing circuitry 1170. Radio front end circuitry 1192 may receive digital data that is to be sent out to other network nodes or WDs via a wireless connection. Radio front end circuitry 1192 may convert the digital data into a radio signal having the appropriate channel and bandwidth parameters using a combination of filters 1198 and/or amplifiers 1196. The radio signal may then be transmitted via antenna 1162. Similarly, when receiving data, antenna 1162 may collect radio signals which are then converted into digital data by radio front end circuitry 1192. The digital data may be passed to processing circuitry 1170. In other embodiments, the interface may comprise different components and/or different combinations of components.

In certain alternative embodiments, network node 1160 may not include separate radio front end circuitry 1192, instead, processing circuitry 1170 may comprise radio front end circuitry and may be connected to antenna 1162 without separate radio front end circuitry 1192. Similarly, in some embodiments, all or some of RF transceiver circuitry 1172 may be considered a part of interface 1190. In still other embodiments, interface 1190 may include one or more ports or terminals 1194, radio front end circuitry 1192, and RF transceiver circuitry 1172, as part of a radio unit (not shown), and interface 1190 may communicate with baseband processing circuitry 1174, which is part of a digital unit (not shown).

Antenna 1162 may include one or more antennas, or antenna arrays, configured to send and/or receive wireless signals. Antenna 1162 may be coupled to radio front end circuitry 1190 and may be any type of antenna capable of transmitting and receiving data and/or signals wirelessly. In some embodiments, antenna 1162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1162 may be separate from network node 1160 and may be connectable to network node 1160 through an interface or port.

Antenna 1162, interface 1190, and/or processing circuitry 1170 may be configured to perform any receiving operations and/or certain obtaining operations described herein as being performed by a network node. Any information, data and/or signals may be received from a wireless device, another network node and/or any other network equipment. Similarly, antenna 1162, interface 1190, and/or processing circuitry 1170 may be configured to perform any transmitting operations described herein as being performed by a network node. Any information, data and/or signals may be transmitted to a wireless device, another network node and/or any other network equipment.

Power circuitry 1187 may comprise, or be coupled to, power management circuitry and is configured to supply the components of network node 1160 with power for performing the functionality described herein. Power circuitry 1187 may receive power from power source 1186. Power source 1186 and/or power circuitry 1187 may be configured to provide power to the various components of network node 1160 in a form suitable for the respective components (e.g., at a voltage and current level needed for each respective component). Power source 1186 may either be included in, or external to, power circuitry 1187 and/or network node 1160. For example, network node 1160 may be connectable to an external power source (e.g., an electricity outlet) via an input circuitry or interface such as an electrical cable, whereby the external power source supplies power to power circuitry 1187. As a further example, power source 1186 may comprise a source of power in the form of a battery or battery pack which is connected to, or integrated in, power circuitry 1187. The battery may provide backup power should the external power source fail. Other types of power sources, such as photovoltaic devices, may also be used.

Alternative embodiments of network node 1160 may include additional components beyond those shown in FIG. 11 that may be responsible for providing certain aspects of the network node's functionality, including any of the functionality described herein and/or any functionality necessary to support the subject matter described herein. For example, network node 1160 may include user interface equipment to allow input of information into network node 1160 and to allow output of information from network node 1160. This may allow a user to perform diagnostic, maintenance, repair, and other administrative functions for network node 1160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1110 includes antenna 1111, interface 1114, processing circuitry 1120, device readable medium 1130, user interface equipment 1132, auxiliary equipment 1134, power source 1136 and power circuitry 1137. WD 1110 may include multiple sets of one or more of the illustrated components for different wireless technologies supported by WD 1110, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1110.

Antenna 1111 may include one or more antennas or antenna arrays, configured to send and/or receive wireless signals, and is connected to interface 1114. In certain alternative embodiments, antenna 1111 may be separate from WD 1110 and be connectable to WD 1110 through an interface or port. Antenna 1111, interface 1114, and/or processing circuitry 1120 may be configured to perform any receiving or transmitting operations described herein as being performed by a WD. Any information, data and/or signals may be received from a network node and/or another WD. In some embodiments, radio front end circuitry and/or antenna 1111 may be considered an interface.

As illustrated, interface 1114 comprises radio front end circuitry 1112 and antenna 1111. Radio front end circuitry 1112 comprise one or more filters 1118 and amplifiers 1116. Radio front end circuitry 1114 is connected to antenna 1111 and processing circuitry 1120, and is configured to condition signals communicated between antenna 1111 and processing circuitry 1120. Radio front end circuitry 1112 may be coupled to or a part of antenna 1111. In some embodiments, WD 1110 may not include separate radio front end circuitry 1112; rather, processing circuitry 1120 may comprise radio front end circuitry and may be connected to antenna 1111. Similarly, in some embodiments, some or all of RF transceiver circuitry 1122 may be considered a part of interface 1114. Radio front end circuitry 1112 may receive digital data that is to be sent out to other network nodes or WDs via a wireless connection. Radio front end circuitry 1112 may convert the digital data into a radio signal having the appropriate channel and bandwidth parameters using a combination of filters 1118 and/or amplifiers 1116. The radio signal may then be transmitted via antenna 1111. Similarly, when receiving data, antenna 1111 may collect radio signals which are then converted into digital data by radio front end circuitry 1112. The digital data may be passed to processing circuitry 1120. In other embodiments, the interface may comprise different components and/or different combinations of components.

Processing circuitry 1120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1110 components, such as device readable medium 1130, WD 1110 functionality. Such functionality may include providing any of the various wireless features or benefits discussed herein. For example, processing circuitry 1120 may execute instructions stored in device readable medium 1130 or in memory within processing circuitry 1120 to provide the functionality disclosed herein.

As illustrated, processing circuitry 1120 includes one or more of RF transceiver circuitry 1122, baseband processing circuitry 1124, and application processing circuitry 1126. In other embodiments, the processing circuitry may comprise different components and/or different combinations of components. In certain embodiments processing circuitry 1120 of WD 1110 may comprise a SOC. In some embodiments, RF transceiver circuitry 1122, baseband processing circuitry 1124, and application processing circuitry 1126 may be on separate chips or sets of chips. In alternative embodiments, part or all of baseband processing circuitry 1124 and application processing circuitry 1126 may be combined into one chip or set of chips, and RF transceiver circuitry 1122 may be on a separate chip or set of chips. In still alternative embodiments, part or all of RF transceiver circuitry 1122 and baseband processing circuitry 1124 may be on the same chip or set of chips, and application processing circuitry 1126 may be on a separate chip or set of chips. In yet other alternative embodiments, part or all of RF transceiver circuitry 1122, baseband processing circuitry 1124, and application processing circuitry 1126 may be combined in the same chip or set of chips. In some embodiments, RF transceiver circuitry 1122 may be a part of interface 1114. RF transceiver circuitry 1122 may condition RF signals for processing circuitry 1120.

In certain embodiments, some or all of the functionality described herein as being performed by a WD may be provided by processing circuitry 1120 executing instructions stored on device readable medium 1130, which in certain embodiments may be a computer-readable storage medium. In alternative embodiments, some or all of the functionality may be provided by processing circuitry 1120 without executing instructions stored on a separate or discrete device readable storage medium, such as in a hard-wired manner. In any of those particular embodiments, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 may be configured to perform any determining, calculating, or similar operations (e.g., certain obtaining operations) described herein as being performed by a WD. These operations, as performed by processing circuitry 1120, may include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 may be operable to store a computer program, software, an application including one or more of logic, rules, code, tables, etc. and/or other instructions capable of being executed by processing circuitry 1120. Device readable medium 1130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1120. In some embodiments, processing circuitry 1120 and device readable medium 1130 may be considered to be integrated.

User interface equipment 1132 may provide components that allow for a human user to interact with WD 1110. Such interaction may be of many forms, such as visual, audial, tactile, etc. User interface equipment 1132 may be operable to produce output to the user and to allow the user to provide input to WD 1110. The type of interaction may vary depending on the type of user interface equipment 1132 installed in WD 1110. For example, if WD 1110 is a smart phone, the interaction may be via a touch screen; if WD 1110 is a smart meter, the interaction may be through a screen that provides usage (e.g., the number of gallons used) or a speaker that provides an audible alert (e.g., if smoke is detected). User interface equipment 1132 may include input interfaces, devices and circuits, and output interfaces, devices and circuits. User interface equipment 1132 is configured to allow input of information into WD 1110, and is connected to processing circuitry 1120 to allow processing circuitry 1120 to process the input information. User interface equipment 1132 may include, for example, a microphone, a proximity or other sensor, keys/buttons, a touch display, one or more cameras, a USB port, or other input circuitry. User interface equipment 1132 is also configured to allow output of information from WD 1110, and to allow processing circuitry 1120 to output information from WD 1110. User interface equipment 1132 may include, for example, a speaker, a display, vibrating circuitry, a USB port, a headphone interface, or other output circuitry. Using one or more input and output interfaces, devices, and circuits, of user interface equipment 1132, WD 1110 may communicate with end users and/or the wireless network, and allow them to benefit from the functionality described herein.

Auxiliary equipment 1134 is operable to provide more specific functionality which may not be generally performed by WDs. This may comprise specialized sensors for doing measurements for various purposes, interfaces for additional types of communication such as wired communications etc. The inclusion and type of components of auxiliary equipment 1134 may vary depending on the embodiment and/or scenario.

Power source 1136 may, in some embodiments, be in the form of a battery or battery pack. Other types of power sources, such as an external power source (e.g., an electricity outlet), photovoltaic devices or power cells, may also be used. WD 1110 may further comprise power circuitry 1137 for delivering power from power source 1136 to the various parts of WD 1110 which need power from power source 1136 to carry out any functionality described or indicated herein. Power circuitry 1137 may in certain embodiments comprise power management circuitry. Power circuitry 1137 may additionally or alternatively be operable to receive power from an external power source; in which case WD 1110 may be connectable to the external power source (such as an electricity outlet) via input circuitry or an interface such as an electrical power cable. Power circuitry 1137 may also in certain embodiments be operable to deliver power from an external power source to power source 1136. This may be, for example, for the charging of power source 1136. Power circuitry 1137 may perform any formatting, converting, or other modification to the power from power source 1136 to make the power suitable for the respective components of WD 1110 to which power is supplied.

Figure 12:
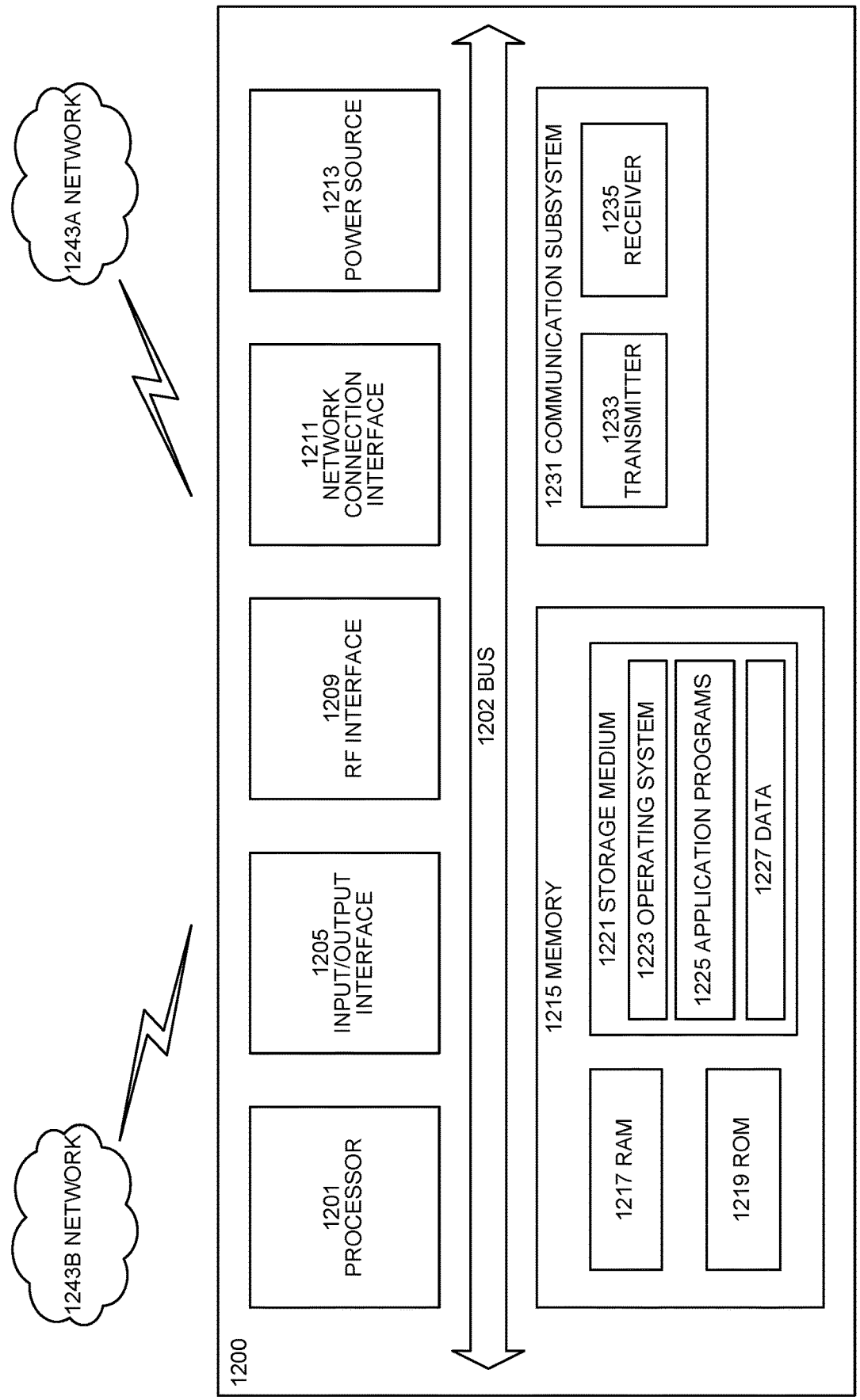
FIG. 12 is a block diagram of a user equipment according to some embodiments.

FIG. 12 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 12200 may be any UE identified by the $3^{rd}$ Generation Partnership Project (3GPP), including a NB-IoT UE, a machine type communication (MTC) UE, and/or an enhanced MTC (eMTC) UE. UE 1200, as illustrated in FIG. 12, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 12 is a UE, the components discussed herein are equally applicable to a WD, and vice-versa.

In FIG. 12, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1233, and/or any other component, or any combination thereof. Storage medium 1221 includes operating system 1223, application program 1225, and data 1227. In other embodiments, storage medium 1221 may include other similar types of information. Certain UEs may utilize all of the components shown in FIG. 12, or only a subset of the components. The level of integration between the components may vary from one UE to another UE. Further, certain UEs may contain multiple instances of a component, such as multiple processors, memories, transceivers, transmitters, receivers, etc.

In FIG. 12, processing circuitry 1201 may be configured to process computer instructions and data. Processing circuitry 1201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 may include two central processing units (CPUs). Data may be information in a form suitable for use by a computer.

In the depicted embodiment, input/output interface 1205 may be configured to provide a communication interface to an input device, output device, or input and output device. UE 1200 may be configured to use an output device via input/output interface 1205. An output device may use the same type of interface port as an input device. For example, a USB port may be used to provide input to and output from UE 1200. The output device may be a speaker, a sound card, a video card, a display, a monitor, a printer, an actuator, an emitter, a smartcard, another output device, or any combination thereof. UE 1200 may be configured to use an input device via input/output interface 1205 to allow a user to capture information into UE 1200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 12, RF interface 1209 may be configured to provide a communication interface to RF components such as a transmitter, a receiver, and an antenna. Network connection interface 1211 may be configured to provide a communication interface to network 1243*a*. Network 1243*a* may encompass wired and/or wireless networks such as a local-area network (LAN), a wide-area network (WAN), a computer network, a wireless network, a telecommunications network, another like network or any combination thereof. For example, network 1243*a* may comprise a Wi-Fi network. Network connection interface 1211 may be configured to include a receiver and a transmitter interface used to communicate with one or more other devices over a communication network according to one or more communication protocols, such as Ethernet, TCP/IP, SONET, ATM, or the like. Network connection interface 1211 may implement receiver and transmitter functionality appropriate to the communication network links (e.g., optical, electrical, and the like). The transmitter and receiver functions may share circuit components, software or firmware, or alternatively may be implemented separately.

RAM 1217 may be configured to interface via bus 1202 to processing circuitry 1201 to provide storage or caching of data or computer instructions during the execution of software programs such as the operating system, application programs, and device drivers. ROM 1219 may be configured to provide computer instructions or data to processing circuitry 1201. For example, ROM 1219 may be configured to store invariant low-level system code or data for basic system functions such as basic input and output (I/O), startup, or reception of keystrokes from a keyboard that are stored in a non-volatile memory. Storage medium 1221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1221 may be configured to include operating system 1223, application program 1225 such as a web browser application, a widget or gadget engine or another application, and data file 1227. Storage medium 1221 may store, for use by UE 1200, any of a variety of various operating systems or combinations of operating systems.

Storage medium 1221 may be configured to include a number of physical drive units, such as redundant array of independent disks (RAID), floppy disk drive, flash memory, USB flash drive, external hard disk drive, thumb drive, pen drive, key drive, high-density digital versatile disc (HD- DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory, a tamper-resistant module such as a UICC, eUICC and iUICC including a subscriber identity module (SIM) such as USIM, other memory, or any combination thereof. Storage medium 1221 may allow UE 1200 to access computer-executable instructions, application programs or the like, stored on transitory or non-transitory memory media, to off-load data, or to upload data. An article of manufacture, such as one utilizing a communication system may be tangibly embodied in storage medium 1221, which may comprise a device readable medium.

In FIG. 12, processing circuitry 1201 may be configured to communicate with network 1243b using communication subsystem 1231. Network 1243a and network 1243b may be the same network or networks or different network or networks. Communication subsystem 1231 may be configured to include one or more transceivers used to communicate with network 1243b. For example, communication subsystem 1231 may be configured to include one or more transceivers used to communicate with one or more remote transceivers of another device capable of wireless communication such as another WD, UE, or base station of a radio access network (RAN) according to one or more communication protocols, such as IEEE 802.12, CDMA, WCDMA, GSM, LTE, UTRAN, WiMax, or the like. Each transceiver may include transmitter 1233 and/or receiver 1235 to implement transmitter or receiver functionality, respectively, appropriate to the RAN links (e.g., frequency allocations and the like). Further, transmitter 1233 and receiver 1235 of each transceiver may share circuit components, software or firmware, or alternatively may be implemented separately.

In the illustrated embodiment, the communication functions of communication subsystem 1231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 may include cellular communication, Wi-Fi communication, Bluetooth communication, and GPS communication. Network 1243b may encompass wired and/or wireless networks such as a local-area network (LAN), a wide-area network (WAN), a computer network, a wireless network, a telecommunications network, another like network or any combination thereof. For example, network 1243b may be a cellular network, a Wi-Fi network, and/or a near-field network. Power source 1213 may be configured to provide alternating current (AC) or direct current (DC) power to components of UE 1200.

The features, benefits and/or functions described herein may be implemented in one of the components of UE 1200 or partitioned across multiple components of UE 1200. Further, the features, benefits, and/or functions described herein may be implemented in any combination of hardware, software or firmware. In one example, communication subsystem 1231 may be configured to include any of the components described herein. Further, processing circuitry 1201 may be configured to communicate with any of such components over bus 1202. In another example, any of such components may be represented by program instructions stored in memory that when executed by processing circuitry 1201 perform the corresponding functions described herein. In another example, the functionality of any of such components may be partitioned between processing circuitry 1201 and communication subsystem 1231. In another example, the non-computationally intensive functions of any of such components may be implemented in software or firmware and the computationally intensive functions may be implemented in hardware.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The invention claimed is:

1. A method performed by a network equipment configured for use in a wireless communication network, the method comprising:

receiving, over an interface with radio equipment, a request for information based on which is determinable an unobfuscated identifier associated with a target being tracked by the radio equipment, wherein the unobfuscated identifier is obfuscated by an obfuscating identifier associated with the target, and wherein the radio equipment is a radio equipment of a law enforcement agency and the radio equipment is authorized and/or authenticated by the wireless communication network; and sending, from the network equipment to the radio equipment, a response that includes the requested information.

2. A network equipment configured for use in a wireless communication network, the network equipment comprising:

communication circuitry; and processing circuitry configured to:
receive, over an interface with radio equipment, a request for information based on which is determinable an unobfuscated identifier associated with a target tracked by the radio equipment, wherein the unobfuscated identifier is obfuscated by an obfuscating identifier associated with the target and wherein the radio equipment is a radio equipment of a law enforcement agency and the radio equipment is authorized and/or authenticated by the wireless communication network; and send, from the network equipment to the radio equipment, a response that includes the requested information.

3. The network equipment of claim 2, wherein the request includes obfuscating identifiers that the radio equipment detects as being transmitted over-the-air as the radio equipment tracks the target over time, wherein each obfuscating identifier obfuscates a respective unobfuscated identifier.

4. The network equipment of claim 3, wherein each obfuscating identifier comprises an encrypted version of the associated unobfuscated identifier or a temporary identifier whose association with a respective unobfuscated identifier is only temporary.

5. The network equipment of claim 3, wherein each obfuscating identifier is a Subscription Concealed Identifier (SUCI).

6. The network equipment of claim 2, wherein the request indicates where and when the target has been or will be tracked by the radio equipment.

7. The network equipment of claim 2, wherein the unobfuscated identifier associated with the target is a Subscription Permanent Identifier (SUPI) or a Permanent Equipment Identifier (PEI) or an International Mobile Subscriber Identity (IMSI) or an International Mobile Equipment Identifier (IMEI).

8. The network equipment of claim 2, wherein the network equipment implements at least a Unified Data Management (UDM) function or a Subscription Identifier Deconcealing Function (SIDF) or the network equipment implements at least a Lawful Intercept Administration Function (ADMF) or the network equipment implements at least a Mediation Function 2 (MF2).

9. The network equipment of claim 2, wherein the interface is an interface configured for real time communication.

10. A method performed by radio equipment for tracking a target, the radio equipment being a radio equipment of a law enforcement agency, the method comprising:

sending, over an interface to network equipment in a wireless communication network, a request for information based on which is determinable an unobfuscated identifier associated with the target, wherein the unobfuscated identifier is obfuscated by an obfuscating identifier associated with the target and the radio equipment is authorized and/or authenticated by the wireless communication network; and receiving, from the network equipment, a response that comprises the requested information.

11. Radio equipment, the radio equipment being a radio equipment of a law enforcement agency, the radio equipment comprising:

radio frequency circuitry; and processing circuitry configured to:
send, over an interface to network equipment in a wireless communication network, a request for information based on which is determinable an unobfuscated identifier associated with a target tracked by the radio equipment, wherein the unobfuscated identifier is obfuscated by an obfuscating identifier associated with the target and the radio equipment is authorized and/or authenticated by the wireless communication network; and receive, from the network equipment, a response that includes the requested information.

12. The radio equipment of claim 11, wherein the processing circuitry is further configured to detect obfuscating identifiers transmitted over-the-air as the radio equipment tracks the target over time, wherein each obfuscating identifier obfuscates a respective unobfuscated identifier, and wherein the request includes the obfuscating identifiers detected.

13. The radio equipment of claim 12, wherein the processing circuitry is configured to detect obfuscating identifiers transmitted over-the-air by:

simulating radio network equipment of the wireless communication network, and requesting and receiving the obfuscating identifiers from respective wireless devices that are attempting to attach to the radio network equipment or perform location updates; or passively monitoring for obfuscating identifiers transmitted in location update messages or paging messages.

14. The radio equipment of claim 11, wherein the request indicates where and when the target has been or will be tracked by the radio equipment.

15. The radio equipment of claim 14, wherein a timestamp in the request indicates when the target has been or will be tracked by the radio equipment and wherein geographical coordinates in the request indicate where the target has been or will be tracked by the radio equipment or indicate a geographical location of the radio equipment.

16. The radio equipment of claim 11, wherein the requested information included in the response comprises the unobfuscated identifier associated with the target.

17. The radio equipment of claim 12, wherein each obfuscating identifier comprises an encrypted version of the associated unobfuscated identifier or a temporary identifier whose association with a respective unobfuscated identifier is only temporary.

18. The radio equipment of claim 11, wherein the unobfuscated identifier associated with the target is a Subscription Permanent Identifier (SUPI) or a Permanent Equipment Identifier (PEI) or an International Mobile Subscriber Identity (IMSI) or an International Mobile Equipment Identifier (IMEI).

19. The radio equipment of claim 11, wherein the network equipment implements at least a Unified Data Management (UDM) function or a Subscription Identifier Deconcealing Function (SIDF) or the network equipment implements at least a Lawful Intercept Administration Function (ADMF) or the network equipment implements at least a Mediation Function 2 (MF2).

20. The radio equipment of claim 11, wherein the radio equipment is a cell site simulator, a false base station, or an IMSI catcher.

\* \* \* \* \*